United States Patent
Chen et al.

(10) Patent No.: US 11,757,375 B2
(45) Date of Patent: Sep. 12, 2023

(54) DC-AC INVERTER SYSTEM USING STATE OBSERVER AND CONTROL METHOD THEREOF

(71) Applicant: INDUSTRIAL TECHNOLOGY RESEARCH INSTITUTE, Hsinchu (TW)

(72) Inventors: Wan-Pei Chen, Qionglin Township (TW); Yoshihiro Konishi, Zhubei (TW); Kuan-Wen Chen, New Taipei (TW); Yeh-Hsiang Ho, Jhongpu Township (TW); Wan-Ju Ho, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 15 days.

(21) Appl. No.: 17/719,789

(22) Filed: Apr. 13, 2022

(65) Prior Publication Data
US 2023/0208318 A1 Jun. 29, 2023

Related U.S. Application Data

(60) Provisional application No. 63/293,852, filed on Dec. 27, 2021.

(30) Foreign Application Priority Data

Mar. 4, 2022 (TW) .................................. 111108083

(51) Int. Cl.
*H02M 7/5387* (2007.01)
*H02M 1/00* (2006.01)
*H02M 1/14* (2006.01)

(52) U.S. Cl.
CPC ..... *H02M 7/53871* (2013.01); *H02M 1/0009* (2021.05); *H02M 1/14* (2013.01); *H02M 7/53873* (2013.01)

(58) Field of Classification Search
CPC . H02M 7/48; H02M 7/53871; H02M 7/53873
See application file for complete search history.

(56) References Cited

U.S. PATENT DOCUMENTS

| 9,184,687 B2 | 11/2015 | Handa |
| 9,341,660 B2 | 5/2016 | Wu et al. |

(Continued)

FOREIGN PATENT DOCUMENTS

| CN | 100588073 C | 2/2010 |
| CN | 101505109 B | 12/2010 |

(Continued)

OTHER PUBLICATIONS

Ahmed et al., "Sensorless Current Control of Three-Phase Inverter-Based Distributed Generation," IEEE Transactions on Power Delivery, vol. 24., No. 2., Apr. 2009, pp. 919-929.

(Continued)

*Primary Examiner* — Gary A Nash
(74) *Attorney, Agent, or Firm* — Birch, Stewart, Kolasch & Birch, LLP

(57) ABSTRACT

A DC-AC inverter system using a state observer and a control method thereof are provided. The control method of the DC-AC inverter system includes the following steps. The state observer outputs a filter-capacitor-current estimation value at a next sampling time according to a DC link voltage at a current sampling time and a filter-capacitor-voltage actual value at the current sampling time. The filter-inductor-current estimation value at the next sampling time is compared with the filter-capacitor-current estimation value at the next sampling time to obtain a load current (Continued)

estimation value at the next sampling time. An inductor voltage estimator outputs a filter-inductor-voltage estimation value at the next sampling time according to the load current estimation value at the next sampling time. A feedforward control is performed according to the filter-inductor-voltage estimation value at the next sampling time.

18 Claims, 15 Drawing Sheets

(56) References Cited

U.S. PATENT DOCUMENTS

| | | | |
|---|---|---|---|
| 9,450,528 | B2 | 9/2016 | Yasui |
| 10,103,647 | B2 | 10/2018 | Huang et al. |
| 10,632,999 | B2 | 4/2020 | Thyagarajan |
| 2010/0131219 | A1* | 5/2010 | Kenly ............... G01R 19/0092 702/64 |
| 2016/0094149 | A1* | 3/2016 | Pahlevaninezhad ....................... H02M 7/53871 363/97 |
| 2018/0054139 | A1* | 2/2018 | Huang .................. H02M 1/14 |

FOREIGN PATENT DOCUMENTS

| | | |
|---|---|---|
| CN | 101557174 B | 5/2012 |
| CN | 191938221 B | 11/2012 |
| CN | 103346585 B | 5/2015 |
| CN | 103684028 B | 8/2016 |
| CN | 104022511 B | 8/2016 |
| CN | 110601515 B | 1/2022 |
| TW | 202001268 A | 1/2020 |
| TW | 1702782 B | 8/2020 |
| WO | WO 2011/098099 A | 8/2011 |

OTHER PUBLICATIONS

Eren et al., "Grid-Connected Voltage Source Inverter for Renewable Energy Conversion System with Sensorless Current Control," IEEE, 2010, pp. 768-772.

Ito et al., "Microprocessor-Based Robust Digital Control for UPS with Three-Phase PWM Inverter," IEEE Transactions on Power Electronics, vol. 10, No. 2, Mar. 1995, pp. 196-204.

Loh et al., "A Comparative Analysis of Multiloop Voltage Regulation Strategies for Single and Three-Phase UPS Systems," IEEE Transactions on Power Electronics, vol. 18, No. 5, Sep. 2003, pp. 1176-1185.

Yisheng et al., "Development of a Current-Sensorless Multi-Loop Control for Standalone PWM Inverters," The 7th International Conference on Power Electronics, EXCO, Daegu, Korea, Oct. 22-26, 2017, pp. 598-601.

Yokoyama et al., "Disturbance Observer Based Fully Digital Controlled PWM inverter for CVCF Operation," IEEE Transactions of Power Electronics, vol. 9, No. 5, Sep. 1994, pp. 473-480.

Zhou et al., "New inductor Current Feedback Control with Active Harmonics Injection for Inverter Stage of Solid State Transformer," IEEE, 2010, pp. 593-598.

Taiwanese Notice of Allowance and Search Report for Taiwanese Application No. 111108083, dated Oct. 24, 2022.

* cited by examiner (Time : 5ms/div, $v_C$ : 200V/div, $i_L$ : 20A/div, $\hat{i}_L$ : 20A/div, $i_C$ : 2A/div)

(Time : 5ms/div, $v_C$ : 200V/div, $\hat{v}_C$ : 200V/div, $i_L$ : 20A/div, $i_C$ : 2A/div)

(Time : 5ms/div, $v_C$ : 200V/div, $i_L$ : 20A/div )

DC-AC INVERTER SYSTEM USING STATE OBSERVER AND CONTROL METHOD THEREOF

This application claims the benefit of U.S. provisional application Ser. No. 63/293,852, filed Dec. 27, 2021 and Taiwan application Serial No. 111108083, filed Mar. 4, 2022, the disclosure of which is incorporated by reference herein in its entirety.

TECHNICAL FIELD

The disclosure relates in general to a DC-AC inverter system and a control method thereof, and more particularly to a DC-AC inverter system using a state observer and a control method thereof.

BACKGROUND

There are quite a lot of control methods for DC-AC inverters. No matter any control method, there are three main currents to be controlled: the filter inductor current, the filter capacitor current and the load current. According to the research result of the literatures, the control method for controlling the filter capacitor current can not only use the cheaper detection components, but also have the best dynamic response. However, the filter capacitor current itself contains ripples. If the detection method is executed with the hardware circuit, the ripples must be filtered by the filter circuit, and the filter circuit will cause the signal distortion and delay problems.

In the DC-AC inverter applied to the on-grid mode, a load current sensor needs to be installed at the AC side to control the magnitude of the current outputted from the inverter. The use of hardware sensors has to bear the cost of labor and materials such as procurement, management, and manufacturing processes caused by the use of components. The changes in component characteristics due to temperature changes and damage to the component itself or the sensing circuit affect the reliability of the inverter system.

In the digital control system, the design and calculation method of the traditional controller will perform sampling of the controlled variable and calculation of the controller at the current sampling time, and output the calculated control signal at the next sampling time. But at this time, the control target has become the controlled variable after one sampling time, thus causing the problem of time delay in control.

SUMMARY

The disclosure is directed to a DC-AC inverter system using a state observer and a control method thereof. The DC link voltage, the inductor current and the filter capacitor voltage are detected by a hardware circuit, then the filter capacitor voltage, the filter capacitor current, the disturbance voltage, the load current and the inductor voltage can be estimated. The filter-capacitor-current estimation value can be obtained without any hardware sensor, and the average value of the filter-capacitor-current estimation value is not affected by the ripples. On the other hand, the estimated value at the next sampling time is used as the feedback value of the entire system control process, so the control time delay problem of the digital controller and the system performance can be improved. The control method proposed in this disclosure is applicable regardless of the on-grid mode, the standalone mode or the transfer mode. All parameters of the state observer are controllable factors, having high accuracy and predictability. The system is controlled by the filter capacitor current, and the system responds well. The system is controlled digitally, and the calculation results of the state observer can reduce the sampling time error. In addition, the load current can be predicted without a hardware sensor, which can reduce the cost of materials, labor procurement and maintenance, and avoid the influence of temperature changes changing component characteristics, component and line failures, so it can improve the reliability of the system.

According to one embodiment, a control method of a DC-AC inverter system is provided. The control method of the DC-AC inverter system includes the following steps. A state observer receives a DC link voltage at a current sampling time and a filter-capacitor-voltage actual value at the current sampling time. The state observer outputs a filter-capacitor-current estimation value at a next sampling time according to the DC link voltage at the current sampling time and the filter-capacitor-voltage actual value at the current sampling time. The filter-capacitor-current estimation value at the next sampling time is an average current value without ripple. An inductor current calculator receives a filter-inductor-current actual value at the current sampling time. The inductor current calculator outputs a filter-inductor-current estimation value at the next sampling time according to the DC link voltage at the current sampling time and the filter-inductor-current actual value at the current sampling time. The filter-inductor-current estimation value at the next sampling time is compared with the filter-capacitor-current estimation value at the next sampling time to obtain a load current estimation value at the next sampling time. An inductor voltage estimator outputs an filter-inductor-voltage estimation value at the next sampling time according to the load current estimation value at the next sampling time. A feed-forward control is performed according to the filter-inductor-voltage estimation value at the next sampling time.

According to another embodiment, a DC-AC inverter system is provided. The DC-AC inverter system includes a state observer, an inductor current calculator, a first comparator and an inductor voltage estimator. The state observer is configured to receive a DC link voltage at a current sampling time and a filter-capacitor-voltage actual value at the current sampling time, and output a filter-capacitor-current estimation value at a next sampling time according to the DC link voltage at the current sampling time and the filter-capacitor-voltage actual value at the current sampling time. The filter-capacitor-current estimation value at the next sampling time is an average current value without ripple. The inductor current calculator is configured to receive a filter-inductor-current actual value at the current sampling time, and output a filter-inductor-current estimation value at the next sampling time according to the DC link voltage at the current sampling time and the filter-inductor-current actual value at the current sampling time. The first comparator is configured to compare the filter-inductor-current estimation value at the next sampling time with the filter-capacitor-current estimation value at the next sampling time to obtain a load current estimation value at the next sampling time. The inductor voltage estimator is configured to output an filter-inductor-voltage estimation value at the next sampling time according to the load current estimation value at the next sampling time. The filter-inductor-voltage estimation value at the next sampling time is used for performing the feed-forward control.

Figure 1:
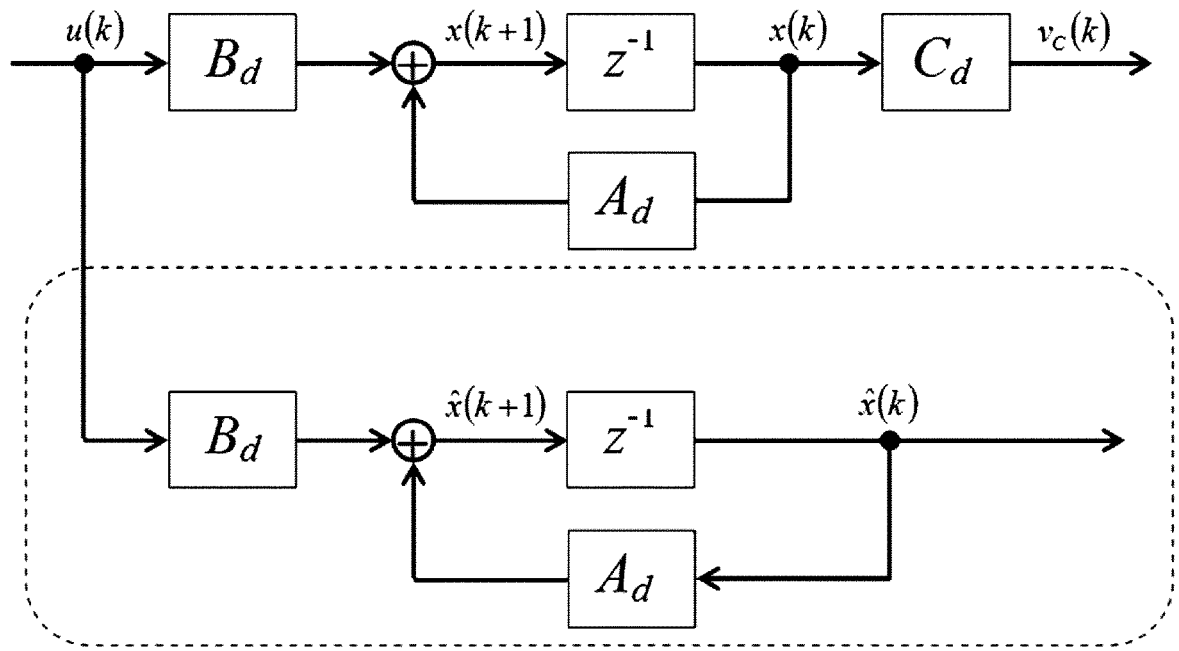
FIG. 1 shows a control block diagram of an open-loop state observer.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The present disclosure provides a DC-AC inverter system using a state observer and a control method thereof. The filter capacitor current and the load current are obtained without any external hardware sensor or detection circuit, so the cost of components can be reduced and the reliability of the system can be improved. The filter capacitor current signal obtained by the state observer is an average value without ripple, and the calculated filter capacitor current and the load current are both estimated signals at the next sampling time. There is no sampling time error, and the overall system performance can be improved.

Figure 2:
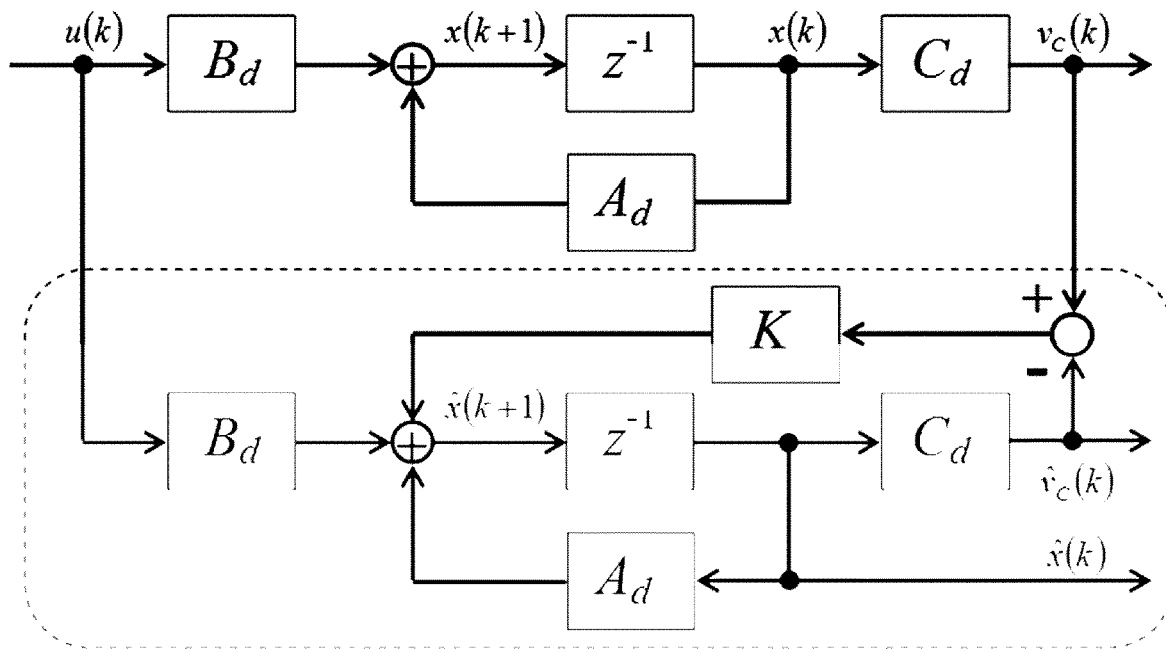
FIG. 2 shows a control block diagram of a closed-loop state observer.

Please refer to FIGS. 1 to 2. FIG. 1 shows a control block diagram of an open-loop state observer. FIG. 2 shows a control block diagram of a closed-loop state observer. The state observer may be the open-loop state observer or the closed-loop state observer. As shown in FIGS. 1-2, the difference between the open-loop state observer and the closed-loop state observer is that the closed-loop observer has a feedback signal to reduce the calculation error, and its calculation error is lower than that of the open-loop state observer. In the present disclosure, the state observer is the closed-loop state observer. The equation of the open-loop state observer is shown as the equation (1). The equation of the closed-loop state observer is shown as the equation (2). To obtain the calculations of the closed-loop state observer, it is necessary to derive the open-loop state observer first. The dotted box in FIG. 1 and FIG. 2 is the control block diagram of the state observer. k is the current sampling time, k+1 is the next sampling time, and x represents the parameter elements of the filter capacitor voltage, the filter capacitor current and the disturbance voltage.

$$\dot{\hat{x}} = A\hat{x} + Bu$$

$$y = C\hat{x} \tag{1}$$

$$\dot{\hat{x}} = A\hat{x} + Bu + K(y - C\hat{x})$$

$$y = C\hat{x} \tag{2}$$

Figure 3:
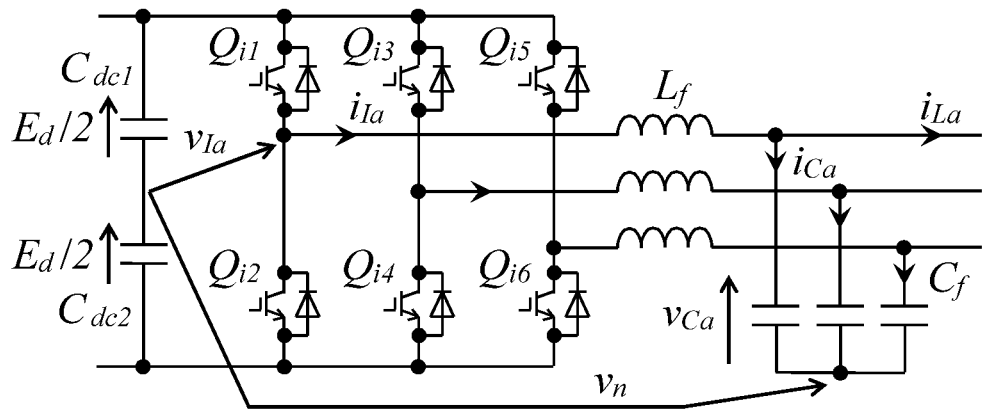
FIG. 3 illustrates an architecture of a three-phase DC-AC inverter according to an embodiment.

The present disclosure provides a sensorless control method for the filter capacitor current and the load current using the state observer, and applies it to a DC-AC inverter system. This disclosure will be illustrated with a three-phase full-bridge inverter, but it is not limited thereto. Please refer to FIG. 3, which illustrates an architecture of a three-phase DC-AC inverter according to an embodiment. As shown in FIG. 3, the three-phase full-bridge circuit includes six switching elements $Q_{i1}$ to $Q_{i6}$, a DC link capacitor and a filter circuit. Every two switching elements $Q_{i1}$ to $Q_{i6}$ form an independent phase. The switching elements $Q_{i1}$ to $Q_{i2}$ form the a phase, the switching elements $Q_{i3}$ to $Q_{i4}$ form the b phase, and the switching elements $Q_{i5}$ to $Q_{i6}$ form the c phase. The DC link capacitor consists of two capacitors $C_{dc1}$, $C_{dc2}$ in series. The filter circuit consists of three filter inductors $L_f$ and three filter capacitors $C_f$. $E_d$ is the DC link voltage, $v_n$ is the capacitor neutral point voltage, $v_{ia}$ is the inverter a-phase AC voltage, $i_{la}$, is the inverter a-phase inductor current, $v_{Ca}$ is the a-phase filter capacitor voltage, $i_{Ca}$ is the a-phase filter capacitor current, and $i_{La}$ is the a-phase load current. The parameters of the remaining b-phase and o-phase are deduced and so on, this is the parameter definition of the phase elements. The parameters of the line elements are the ab line elements and the bc line elements. The D-Q axis element parameters are the D axis elements and the Q axis elements. The control method proposed in this disclosure is applicable to the control of the phase element, the line element, the D-Q axis element of the three-phase DC-AC inverter system and the single-phase DC-AC inverter system, which will be explained as follows.

As shown in FIG. 3, the equations (3) to (5) can be obtained by the circuit principle. $v_{La}$ is the a-phase inductor voltage, $$L_f \frac{di_{la}}{dt}$$

is the inductor voltage equation, $$C_f \frac{dv_{Ca}}{dt}$$

is the filter capacitor voltage equation, $u_a$ is the a-phase modulation index. The three-phase system parameter equations can be expressed as the equation (6).

$$v_{Ia} = L_f \frac{di_{Ia}}{dt} + v_{Ca} + v_n = L_f \frac{di_{Ca}}{dt} + v_{La} + v_{Ca} + v_n = \frac{E_d}{2} u_a \tag{3}$$

$$i_{Ca} = i_{Ia} - i_{La} = C_f \frac{dv_{Ca}}{dt} \tag{4}$$

$$v_n = \frac{v_{Ia} + v_{Ib} + v_{Ic}}{3}$$

$$L_f \frac{di_{Ia}}{dt} = L_f \frac{di_{Ca}}{dt} + L_f \frac{di_{La}}{dt} = L_f \frac{di_{Ca}}{dt} + v_{La} \tag{5}$$

$$v_{La} = L_f \frac{di_{La}}{dt}$$

$$\begin{pmatrix} v_{Ia} \\ v_{Ib} \\ v_{Ic} \end{pmatrix} = L_f \frac{d}{dt} \begin{pmatrix} i_{Ca} \\ i_{Cb} \\ i_{Cc} \end{pmatrix} + \begin{pmatrix} v_{La} \\ v_{Lb} \\ v_{Lc} \end{pmatrix} + \begin{pmatrix} v_{Ca} \\ v_{Cb} \\ v_{Cc} \end{pmatrix} + \begin{pmatrix} 1 \\ 1 \\ 1 \end{pmatrix} v_n \tag{6}$$

$$\begin{pmatrix} v_{La} \\ v_{Lb} \\ v_{Lc} \end{pmatrix} = L_f \frac{d}{dt} \begin{pmatrix} i_{La} \\ i_{Lb} \\ i_{Lc} \end{pmatrix}$$

$$\begin{pmatrix} i_{Ca} \\ i_{Cb} \\ i_{Cc} \end{pmatrix} = \begin{pmatrix} i_{Ia} \\ i_{Ib} \\ i_{Ic} \end{pmatrix} - \begin{pmatrix} i_{La} \\ i_{Lb} \\ i_{Lc} \end{pmatrix} = C_f \frac{d}{dt} \begin{pmatrix} v_{Ca} \\ v_{Cb} \\ v_{Cc} \end{pmatrix}$$

Figure 4:
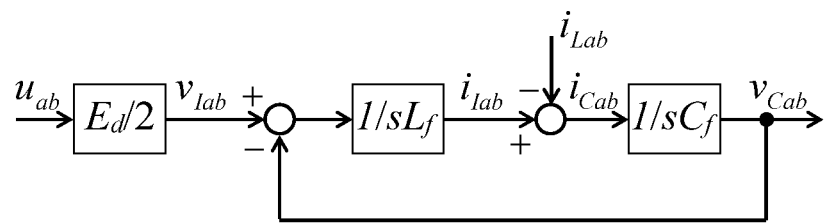
FIG. 4 illustrates a DC-AC inverter model of a line-element DC-AC inverter according to an embodiment.
Figure 5:
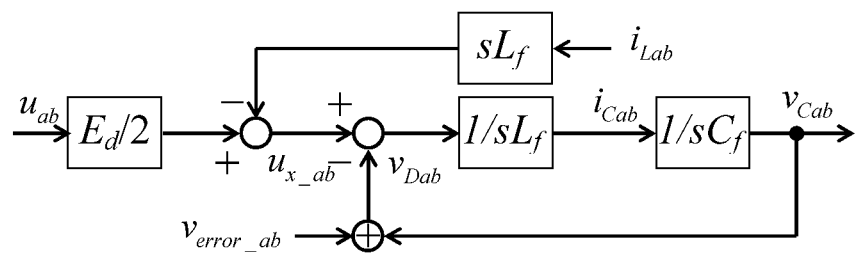
FIG. 5 illustrates a line-element DC-AC inverter model according to another embodiment.

The equation (3) is represented by line elements, and the ab line elements represent the a-phase elements minus the b-phase elements, and the equation (7) can be obtained. Please refer to FIG. 4, which illustrates a DC-AC inverter model of a line-element DC-AC inverter according to an embodiment. In order to make the relationship of each parameter clearer, the equation (7) is simplified as a DC-AC inverter model as shown in FIG. 4. By using $i_{Cab}$ and $v_{Cab}$ as the control parameters, it can be rewritten as the equation (8). When the dead time, the inductor resistance and the voltage error are considered in the equation (8), it can be rearranged into the equation (9). $U_{DT}$ is the dead time factor. $v_\sigma$ is a voltage error with uncertain component. $R_f$ is an inductor resistance including inductor winding. These newly considered variables are replaced with the disturbance voltage $v_D$, as shown in equation (10). $v_{error}$ is the voltage error compensation. Finally, equations (11) and (12) can be obtained, which are equations considering errors and disturbance components. Please refer to FIG. 5, which illustrates a line-element DC-AC inverter model according to another embodiment. If it is converted into a graphical DC-AC inverter model, it is shown in FIG. 5. Assuming that in one sampling period, the voltage error compensation is constant and less than the capacitor voltage, it can be expressed as the equation (13). The equations (11) and (12) are adjusted to the equations with the capacitor voltage, the capacitor current and the disturbance voltage as the state variables, as shown in equations (14) and (15).

$$v_{Iab} = L_f \frac{di_{Cab}}{dt} + v_{Lab} + v_{Cab} = \frac{E_d}{2} u_{ab} \tag{7}$$

$$i_{Cab} = C_f \frac{dv_{Cab}}{dt}$$

$$i_{Cab} = i_{Iab} - i_{Lab}$$

$$L_f \frac{di_{Cab}}{dt} = \frac{E_d}{2} u_{ab} - v_{Cab} - v_{Lab} \tag{8}$$

$$C_f \frac{dv_{Cab}}{dt} = i_{Cab}$$

-continued $$L_f \frac{di_{Cab}}{dt} = \frac{E_d}{2}(u_{ab} + U_{DTab}) - v_{Cab} - v_{Lab} - R_f i_{Iab} - v_{\alpha\_ab} \tag{9}$$

$$C_f \frac{dv_{Cab}}{dt} = i_{Cab}$$

$$v_{Dab} = v_{Cab} - \frac{E_d}{2} U_{DTab} + R_f i_{Iab} + v_{\alpha\_ab} = v_{Cab} + v_{error\_ab} \tag{10}$$

$$v_{error\_ab} = -\frac{E_d}{2} U_{DTab} + R_f i_{Iab} + v_{\alpha\_ab} = -V_{DTab} + R_f i_{Iab} + v_{\alpha\_ab}$$

$$L_f \frac{di_{Cab}}{dt} = \frac{E_d}{2} u_{ab} - v_{Dab} - v_{Lab} \tag{11}$$

$$C_f \frac{dv_{Cab}}{dt} = i_{Cab}$$

$$v_{Lab} = L_f \frac{di_{Lab}}{dt}$$

$$\frac{di_{Cab}}{dt} = \frac{u_{x\_ab} - v_{Dab}}{L_f} \tag{12}$$

$$\frac{dv_{Cab}}{dt} = \frac{i_{Cab}}{C_f}$$

$$u_{x\_ab} = \frac{E_d}{2} u_{ab} - v_{Lab}$$

$$\frac{dv_{Dab}}{dt} = \frac{dv_{Cab}}{dt} + \frac{dv_{error\_ab}}{dt} \tag{13}$$

$$\frac{dv_{error\_ab}}{dt} = 0$$

$$\frac{dv_{Dab}}{dt} = \frac{dv_{Cab}}{dt}$$

$$\frac{d}{dt} \begin{pmatrix} v_{Cab} \\ i_{Cab} \\ v_{Dab} \end{pmatrix} = \begin{pmatrix} 0 & 1/C_f & 0 \\ 0 & 0 & -1/L_f \\ 0 & 1/C_f & 0 \end{pmatrix} \begin{pmatrix} v_{Cab} \\ i_{Cab} \\ v_{Dab} \end{pmatrix} + \begin{pmatrix} 0 \\ 1/L_f \\ 0 \end{pmatrix} u_{x\_ab} \tag{14}$$

$$\dot{x} = Ax + Bu_x \tag{15}$$

$$y = Cx$$

$$A = \begin{pmatrix} 0 & 1/C_f & 0 \\ 0 & 0 & -1/L_f \\ 0 & 1/C_f & 0 \end{pmatrix}$$

$$B = \begin{pmatrix} 0 \\ 1/L_f \\ 0 \end{pmatrix}$$

The state equations (14) and (15) are converted, according to the open-loop state observer equation (1), into discrete forms such as the equation (16). $A_d$, $B_d$ and $C_d$ are obtained by using the conversion operation of the equation (16) and the Laplace transformation method. Finally, the equation (16) is re-substituted and organized into the equations (17) to (19), which are the open-loop state observer equations. T is a sampling period.

$$x^{k+1} = A_d x^k + B_d u_x^k \tag{16}$$

$$A_d = e^{AT}$$

$$B_d = \int_0^T e^{A\tau} B d\tau$$

$$y^k = C_d x^k$$

-continued $$A_d = \begin{pmatrix} 1 & Z_f \sin\omega_f T & \cos\omega_f T - 1 \\ 0 & \cos\omega_f T & -\dfrac{\sin\omega_f T}{Z_f} \\ 0 & Z_f \sin\omega_f T & \cos\omega_f T \end{pmatrix}, B_d = \begin{pmatrix} 1 - \cos\omega_f T \\ \dfrac{\sin\omega_f T}{Z_f} \\ 1 - \cos\omega_f T \end{pmatrix} \quad (17)$$

$$C_d = (1 \ 0 \ 0) \quad (18)$$

$$\omega_f = \sqrt{\dfrac{1}{L_f C_f}}$$

$$Z_f = \sqrt{\dfrac{L_f}{C_f}}$$

$$\begin{pmatrix} v_{Cab}^{k+1} \\ i_{Cab}^{k+1} \\ i_{Dab}^{k+1} \end{pmatrix} = \begin{pmatrix} 1 & Z_f \sin\omega_f T & \cos\omega_f T - 1 \\ 0 & \cos\omega_f T & -\dfrac{\sin\omega_f T}{Z_f} \\ 0 & Z_f \sin\omega_f T & \cos\omega_f T \end{pmatrix} \begin{pmatrix} v_{Cab}^{k} \\ i_{Cab}^{k} \\ i_{Dab}^{k} \end{pmatrix} + \begin{pmatrix} 1 - \cos\omega_f T \\ \dfrac{\sin\omega_f T}{Z_f} \\ 1 - \cos\omega_f T \end{pmatrix} u_{x\_ab}^{k} \quad (19)$$

Assuming $v_C$ is the feedback signal, the closed-loop state observer equation is shown in the equation (2), and it is converted into a discrete equation such as the equation (20). The Deadbeat Control Law is used and $A_d$-$KC_d$ is set to zero to find the gain term K. K is shown as the equation (22). Finally, all the obtained parameters are substituted into the closed-loop observer equation, such as the equation (20) and it is rearranged to obtain the final closed-loop state observer equation, such as the equations (23) and (24).

$$\hat{x}^{k+1} = A_d \hat{x}^k + B_d u_x^k + K(y^k - C_d \hat{x}^k) = (A_d - KC_d)\hat{x}^k + B_d u_x^k + KC_d x^k \quad (20)$$

$$K = \begin{pmatrix} K_1 \\ K_2 \\ K_3 \end{pmatrix} \quad (21)$$

$$K = \left(1 + 2\cos\omega_f T \quad \dfrac{4\cos^2\omega_f T + 2\cos\omega_f T - 1}{2Z_f \sin\omega_f T} \quad \dfrac{2\cos\omega_f T - 4\cos^2\omega_f T + 1}{2(1 - \cos\omega_f T)}\right)^T \quad (22)$$

$$\begin{pmatrix} \hat{v}_{Cab}^{k+1} \\ \hat{i}_{Cab}^{k+1} \\ \hat{v}_{Dab}^{k+1} \end{pmatrix} = \begin{pmatrix} 1 & Z_f \sin\omega_f T & \cos\omega_f T - 1 \\ 0 & \cos\omega_f T & -\dfrac{\sin\omega_f T}{Z_f} \\ 0 & Z_f \sin\omega_f T & \cos\omega_f T \end{pmatrix} \begin{pmatrix} \hat{v}_{Cab}^{k} \\ \hat{i}_{Cab}^{k} \\ \hat{v}_{Dab}^{k} \end{pmatrix} + \begin{pmatrix} 1 - \cos\omega_f T \\ \dfrac{\sin\omega_f T}{Z_f} \\ 1 - \cos\omega_f T \end{pmatrix} u_{x\_ab}^{k} \begin{pmatrix} K_1 \\ K_2 \\ K_3 \end{pmatrix} (v_{Cab}^k - \hat{v}_{Cab}^k) \quad (23)$$

$$u_{x\_ab}^{k} = \dfrac{E_d}{2} u_{ab}^{k} - v_{Lab}^{k} \quad (24)$$

Regarding the calculation of the load current estimation value, the load current at current sampling time can be obtained from the equation (25). Regarding the calculation of the filter-inductor-current estimation value, the equation (26) can be derived from the equation (12), which is transformed into a discrete form as shown in the equation (27), so the load current estimation value at the next sampling time can be obtained through the equation (28).

$$\hat{i}_{Lab}^{k} = i_{Iab}^{k} - \hat{i}_{Cab}^{k} \quad (25)$$

$$\dfrac{di_{Iab}}{dt} = \left(\dfrac{E_d}{2} u_{ab} - v_{Dab}\right)\dfrac{1}{L_f} \quad (26)$$

$$\hat{i}_{Iab}^{k+1} = i_{Iab}^{k} + \left(\dfrac{E_d}{2} u_{ab}^{k} - \dfrac{\hat{v}_{Dab}^{k+1} + \hat{v}_{Dab}^{k+1}}{2}\right)\dfrac{T}{L_f} \quad (27)$$

$$\hat{i}_{Lab}^{k+1} = \hat{i}_{Iab}^{k+1} - \hat{i}_{Cab}^{k+1} \quad (28)$$

Figure 6:
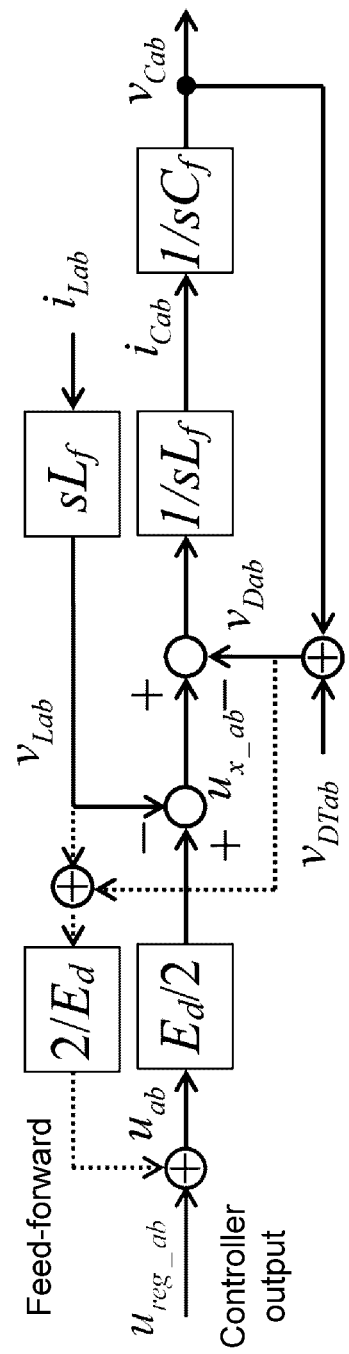
FIG. 6 illustrates a line-element DC-AC inverter model according to another embodiment.

Regarding the calculation of the inductor voltage, the continuous time equation of the inductor voltage of the equation (30) can be obtained from the relational expression of the equation (29) and the High Frequency Limiter method. $\gamma_L$ is a high frequency limiting factor. The Bilinear Transformation method, as shown in the equation (31), is used for the discrete form of the inductor voltage, and the equation obtained by conversion at the current sampling time is shown as the equation (32), and the equation at the next sampling time is shown as the equation (33). Please refer to FIG. 6, which illustrates a line-element DC-AC inverter model according to another embodiment. From the DC-AC inverter model adjustment method shown in FIG. 6, it can be known that the feed-forward compensation control calculation is as shown in the equation (34).

$$v_{Lab} = L_f \dfrac{di_{Lab}}{dt} \quad (29)$$

$$\dfrac{V_{Lab}(s)}{I_{Lab}(s)} = \dfrac{sL_f}{1 + sL_f/\gamma_L} \quad (30)$$

$$s = \dfrac{2}{T} \dfrac{z-1}{z+1} \quad (31)$$

$$\hat{v}_{Lab}^{k} = \dfrac{2L_f - \gamma_L T}{\gamma_L T + 2L_f} \hat{v}_{Lab}^{k-1} + \dfrac{2\gamma_L L_f}{\gamma_L T + 2L_f}\left(\hat{i}_{Lab}^{k} - \hat{i}_{Lab}^{k-1}\right) \quad (32)$$

$$\hat{v}_{Lab}^{k+1} = \dfrac{2L_f - \gamma_L T}{\gamma_L T + 2L_f} \hat{v}_{Lab}^{k} + \dfrac{2\gamma_L L_f}{\gamma_L T + 2L_f}\left(\hat{i}_{Lab}^{k+1} - \hat{i}_{Lab}^{k}\right) \quad (33)$$

-continued $$u_{ab}^{k+1} = u_{reg\_ab}^{k+1} + \dfrac{2}{E_d}\left(\hat{v}_{Dab}^{k+1} - \hat{v}_{Lab}^{k+1}\right) \quad (34)$$

The above has explained the state observer and the derivation process of each parameter in detail. From the obtained equations, it can be seen that as long as the DC link voltage $E_d$, the filter capacitor voltage $v_C^k$ and the inductor current $i_I^k$ are detected and the modulation index $u^k$ is obtained, the filter capacitor voltage $V_C^{k+1}$, the filter capacitor current $i_C^{k+1}$, the load current $i_L^{k+1}$, the inductor voltage $v_L^{k+1}$ and the disturbance voltage $v_D^{k+1}$ at the next sampling time can be obtained. The derived state observer and controller parameters can be applied to the DC-AC inverters for the on-grid mode, the standalone mode and the transfer mode. Please refer to FIG. 7A, which shows a block diagram of the line element control system. By checking the control parameters in FIG. 7A, it can be clearly found that all the control feedback values are the estimated values at the next sampling time obtained by the state observer. There is no sampling time error in the whole control process, which improves the overall system performance.

Summarizing the derived state observer and the calculation of various parameters, the state observer equations for line elements are as shown in the equations (35) to (40), and the equations for the feed-forward compensation control calculation of the line elements are shown in the equations (41) to (43).

$$\hat{i}_{Iab}^{k} = \hat{i}_{Iab}^{k-1} + \left(\frac{E_d}{2}u_{ab}^{k-1} - \frac{\hat{v}_{Dab}^{k} + \hat{v}_{Dab}^{k-1}}{2}\right)\frac{T}{L_f}, \quad (35)$$

$$\hat{i}_{Lab}^{k} = \hat{i}_{Lab}^{k} - \hat{i}_{Cab}^{k} \quad \hat{i}_{Ibc}^{k} = \hat{i}_{Ibc}^{k-1} + \left(\frac{E_d}{2}u_{bc}^{k-1} - \frac{\hat{v}_{Dbc}^{k} + \hat{v}_{Dbc}^{k-1}}{2}\right)\frac{T}{L_f}$$

$$\hat{i}_{Lbc}^{k} = \hat{i}_{Ibc}^{k} - \hat{i}_{Cbc}^{k}$$

$$\hat{v}_{Lab}^{k} = \frac{2L_f - \gamma_L T}{\gamma_L T + 2L_f}\hat{v}_{Lab}^{k-1} + \frac{2\gamma_L L_f}{\gamma_L T + 2L_f}\left(\hat{i}_{Lab}^{k} - \hat{i}_{Lab}^{k-1}\right) \quad (36)$$

$$\hat{v}_{Lbc}^{k} = \frac{2L_f - \gamma_L T}{\gamma_L T + 2L_f}\hat{v}_{Lab}^{k-1} + \frac{2\gamma_L L_f}{\gamma_L T + 2L_f}\left(\hat{i}_{Lbc}^{k} - \hat{i}_{Lbc}^{k-1}\right)$$

$$u_{x\_ab}^{k} = \frac{E_d}{2}u_{ab}^{k} - \hat{v}_{Lab}^{k} \quad (37)$$

$$u_{x\_bc}^{k} = \frac{E_d}{2}u_{bc}^{k} - \hat{v}_{Lbc}^{k}$$

$$\begin{pmatrix}\hat{v}_{Cab}^{k+1}\\\hat{i}_{Cab}^{k+1}\\\hat{v}_{Dab}^{k+1}\end{pmatrix} = \begin{pmatrix}1 & Z_f\sin\omega_f T & \cos\omega_f T - 1\\0 & \cos\omega_f T & -\frac{\sin\omega_f T}{Z_f}\\0 & Z_f\sin\omega_f T & \cos\omega_f T\end{pmatrix}\begin{pmatrix}\hat{v}_{Cab}^{k}\\\hat{i}_{Cab}^{k}\\\hat{v}_{Dab}^{k}\end{pmatrix} + \quad (38)$$

$$\begin{pmatrix}1 - \cos\omega_f T\\\frac{\sin\omega_f T}{Z_f}\\1 - \cos\omega_f T\end{pmatrix}u_{x\_ab}^{k}\begin{pmatrix}K_1\\K_2\\K_3\end{pmatrix}\left(v_{Cab}^{k} - \hat{v}_{Cab}^{k}\right)$$

$$\begin{pmatrix}\hat{v}_{Cbc}^{k+1}\\\hat{i}_{Cbc}^{k+1}\\\hat{v}_{Dbc}^{k+1}\end{pmatrix} = \begin{pmatrix}1 & Z_f\sin\omega_f T & \cos\omega_f T - 1\\0 & \cos\omega_f T & -\frac{\sin\omega_f T}{Z_f}\\0 & Z_f\sin\omega_f T & \cos\omega_f T\end{pmatrix}\begin{pmatrix}\hat{v}_{Cbc}^{k+1}\\\hat{i}_{Cbc}^{k+1}\\\hat{v}_{Dbc}^{k+1}\end{pmatrix} + \quad (39)$$

$$\begin{pmatrix}1 - \cos\omega_f T\\\frac{\sin\omega_f T}{Z_f}\\1 - \cos\omega_f T\end{pmatrix}u_{x\_ab}^{k}\begin{pmatrix}K_1\\K_2\\K_3\end{pmatrix}\left(v_{Cbc}^{k} - \hat{v}_{Cbc}^{k}\right)$$

$$K = \begin{pmatrix}K_1\\K_2\\K_3\end{pmatrix} = \quad (40)$$

$$\left(1 + 2\cos\omega_f T \quad \frac{4\cos^2\omega_f T + 2\cos\omega_f T - 1}{2Z_f\sin\omega_f T} \quad \frac{2\cos\omega_f T - 4\cos^2\omega_f T + 1}{2(1 - \cos\omega_f T)}\right)^T$$

$$\hat{i}_{Iab}^{k+1} = \hat{i}_{Iab}^{k} + \left(\frac{E_d}{2}u_{ab}^{k} - \frac{\hat{v}_{Dab}^{k+1} + \hat{v}_{Dab}^{k}}{2}\right)\frac{T}{L_f} \quad (41)$$

$$\hat{i}_{Lab}^{k+1} = \hat{i}_{Iab}^{k+1} - \hat{i}_{Cab}^{k+1}$$

$$\hat{i}_{Ibc}^{k+1} = \hat{i}_{Ibc}^{k} + \left(\frac{E_d}{2}u_{bc}^{k} - \frac{\hat{v}_{Dbc}^{k+1} + \hat{v}_{Dbc}^{k}}{2}\right)\frac{T}{L_f}$$

$$\hat{i}_{Lbc}^{k+1} = \hat{i}_{Ibc}^{k+1} - \hat{i}_{Cbc}^{k+1}$$

$$\hat{v}_{Lab}^{k+1} = \frac{2L_f - \gamma_L T}{\gamma_L T + 2L_f}\hat{v}_{Lab}^{k} + \frac{2\gamma_L L_f}{\gamma_L T + 2L_f}\left(\hat{i}_{Lab}^{k+1} - \hat{i}_{Lab}^{k}\right) \quad (42)$$

$$\hat{v}_{Lbc}^{k+1} = \frac{2L_f - \gamma_L T}{\gamma_L T + 2L_f}\hat{v}_{Lbc}^{k} + \frac{2\gamma_L L_f}{\gamma_L T + 2L_f}\left(\hat{i}_{Lbc}^{k+1} - \hat{i}_{Lbc}^{k}\right)$$

$$u_{ab}^{k+1} = u_{reg\_ab}^{k+1} + \frac{2}{E_d}\left(\hat{v}_{Dab}^{k+1} + \hat{v}_{Lab}^{k}\right) \quad (43)$$

$$u_{bc}^{k+1} = u_{reg\_bc}^{k+1} + \frac{2}{E_d}\left(\hat{v}_{Dbc}^{k+1} + \hat{v}_{Lbc}^{k}\right)$$

The line element equation can be converted to the phase element equation by using the equation (44). After conversion, the state observer equations of the phase elements can be obtained as the equations (45) to (57). The equations (58) to (66) are the phase element feed-forward compensation control calculations.

$$\begin{pmatrix}a\\b\\c\end{pmatrix} = \frac{1}{3}\begin{pmatrix}1 & 0 & -1\\-1 & 1 & 0\\0 & -1 & 1\end{pmatrix}\begin{pmatrix}ab\\bc\\ca\end{pmatrix} = \frac{1}{3}\begin{pmatrix}2 & 1\\-1 & 1\\-1 & -2\end{pmatrix}\begin{pmatrix}ab\\bc\end{pmatrix} \quad (44)$$

$$\hat{i}_{Ia}^{k} = \hat{i}_{Ia}^{k-1} + \left(\frac{E_d}{2}u_a^{k-1} - \frac{\hat{v}_{Da}^{k} + \hat{v}_{Da}^{k-1}}{2}\right)\frac{T}{L_f} \quad (45)$$

$$\hat{i}_{La}^{k} = \hat{i}_{Ia}^{k} - \hat{i}_{Ca}^{k}$$

$$\hat{v}_{La}^{k} = \frac{2L_f - \gamma_L T}{\gamma_L T + 2L_f}\hat{v}_{La}^{k-1} + \frac{2\gamma_L L_f}{\gamma_L T + 2L_f}\left(\hat{i}_{La}^{k} - \hat{i}_{La}^{k-1}\right) \quad (46)$$

$$u_{x\_a}^{k} = \frac{E_d}{2}u_a^{k} - \hat{v}_{La}^{k} \quad (47)$$

$$\hat{i}_{Ib}^{k} = \hat{i}_{Ib}^{k-1} + \left(\frac{E_d}{2}u_b^{k-1} - \frac{\hat{v}_{Db}^{k} + \hat{v}_{Db}^{k-1}}{2}\right)\frac{T}{L_f} \quad (48)$$

$$\hat{i}_{Lb}^{k} = \hat{i}_{Ib}^{k} - \hat{i}_{Cb}^{k}$$

$$\hat{v}_{Lb}^{k} = \frac{2L_f - \gamma_L T}{\gamma_L T + 2L_f}\hat{v}_{Lb}^{k-1} + \frac{2\gamma_L L_f}{\gamma_L T + 2L_f}\left(\hat{i}_{Lb}^{k} - \hat{i}_{Lb}^{k-1}\right) \quad (49)$$

$$u_{x\_b}^{k} = \frac{E_d}{2}u_b^{k} - \hat{v}_{Lb}^{k} \quad (50)$$

$$\hat{i}_{Ic}^{k} = \hat{i}_{Ic}^{k-1} + \left(\frac{E_d}{2}u_c^{k-1} - \frac{\hat{v}_{Dc}^{k} + \hat{v}_{Dc}^{k-1}}{2}\right)\frac{T}{L_f} \quad (51)$$

$$\hat{i}_{Lc}^{k} = \hat{i}_{Ic}^{k} - \hat{i}_{Cc}^{k}$$

$$\hat{v}_{Lc}^{k} = \frac{2L_f - \gamma_L T}{\gamma_L T + 2L_f}\hat{v}_{Lc}^{k-1} + \frac{2\gamma_L L_f}{\gamma_L T + 2L_f}\left(\hat{i}_{Lc}^{k} - \hat{i}_{Lc}^{k-1}\right) \quad (52)$$

$$u_{x\_c}^{k} = \frac{E_d}{2}u_c^{k} - \hat{v}_{Lc}^{k} \quad (53)$$

$$\begin{pmatrix}\hat{v}_{Ca}^{k+1}\\\hat{i}_{Ca}^{k+1}\\\hat{v}_{Da}^{k+1}\end{pmatrix} = \begin{pmatrix}1 & Z_f\sin\omega_f T & \cos\omega_f T - 1\\0 & \cos\omega_f T & -\frac{\sin\omega_f T}{Z_f}\\0 & Z_f\sin\omega_f T & \cos\omega_f T\end{pmatrix}\begin{pmatrix}\hat{v}_{Ca}^{k}\\\hat{i}_{Ca}^{k}\\\hat{v}_{Da}^{k}\end{pmatrix} + \quad (54)$$

$$\begin{pmatrix}1 - \cos\omega_f T\\\frac{\sin\omega_f T}{Z_f}\\1 - \cos\omega_f T\end{pmatrix}u_{x\_a}^{k} + \begin{pmatrix}K_1\\K_2\\K_3\end{pmatrix}\left(v_{Ca}^{k} - \hat{v}_{Ca}^{k}\right)$$

$$\begin{pmatrix}\hat{v}_{Cb}^{k+1}\\\hat{i}_{Cb}^{k+1}\\\hat{v}_{Db}^{k+1}\end{pmatrix} = \begin{pmatrix}1 & Z_f\sin\omega_f T & \cos\omega_f T - 1\\0 & \cos\omega_f T & -\frac{\sin\omega_f T}{Z_f}\\0 & Z_f\sin\omega_f T & \cos\omega_f T\end{pmatrix}\begin{pmatrix}\hat{v}_{Cb}^{k}\\\hat{i}_{Cb}^{k}\\\hat{v}_{Db}^{k}\end{pmatrix} + \quad (55)$$

$$\begin{pmatrix}1 - \cos\omega_f T\\\frac{\sin\omega_f T}{Z_f}\\1 - \cos\omega_f T\end{pmatrix}u_{x\_b}^{k} + \begin{pmatrix}K_1\\K_2\\K_3\end{pmatrix}\left(v_{Cb}^{k} - \hat{v}_{Cb}^{k}\right)$$

$$\begin{pmatrix} \hat{v}_{Cc}^{k+1} \\ \hat{i}_{Cc}^{k+1} \\ \hat{v}_{Dc}^{k+1} \end{pmatrix} = \begin{pmatrix} 1 & Z_f \sin\omega_f T & \cos\omega_f T - 1 \\ 0 & \cos\omega_f T & -\dfrac{\sin\omega_f T}{Z_f} \\ 0 & Z_f \sin\omega_f T & \cos\omega_f T \end{pmatrix} \begin{pmatrix} \hat{v}_{Cc}^{k} \\ \hat{i}_{Cc}^{k} \\ \hat{v}_{Dc}^{k} \end{pmatrix} + \qquad (56)$$

$$\begin{pmatrix} 1 - \cos\omega_f T \\ \dfrac{\sin\omega_f T}{Z_f} \\ 1 - \cos\omega_f T \end{pmatrix} u_{x\_c}^k + \begin{pmatrix} K_1 \\ K_2 \\ K_3 \end{pmatrix} (v_{Cc}^k - \hat{v}_{Cc}^k)$$

$$K = \begin{pmatrix} K_1 \\ K_2 \\ K_3 \end{pmatrix} = \qquad (57)$$

$$\left( 1 + 2\cos\omega_f T \quad \dfrac{4\cos^2\omega_f T + 2\cos\omega_f T - 1}{2Z_f \sin\omega_f T} \quad \dfrac{2\cos\omega_f T - 4\cos^2\omega_f T + 1}{2(1 - \cos\omega_f T)} \right)^T$$

$$\hat{i}_{Ia}^{k+1} = \hat{i}_{Ia}^{k} + \left( \dfrac{E_d}{2} u_a^k - \dfrac{\hat{v}_{Da}^{k+1} + \hat{v}_{Da}^{k}}{2} \right) \dfrac{T}{L_f} \qquad (58)$$

$$\hat{i}_{La}^{k+1} = \hat{i}_{Ia}^{k+1} - \hat{i}_{Ca}^{k+1}$$

$$\hat{v}_{La}^{k+1} = \dfrac{2L_f - \gamma_L T}{\gamma_L T + 2L_f} \hat{v}_{La}^{k-1} + \dfrac{2\gamma_L L_f}{\gamma_L T + 2L_f} \left( \hat{i}_{La}^{k+1} - \hat{i}_{La}^{k} \right) \qquad (59)$$

$$u_a^{k+1} = u_{reg\_a}^{k+1} \dfrac{2}{E_d} \left( \hat{v}_{Da}^{k+1} + \hat{v}_{La}^{k+1} \right) \qquad (60)$$

$$\hat{i}_{Ib}^{k+1} = \hat{i}_{Ib}^{k} + \left( \dfrac{E_d}{2} u_b^k - \dfrac{\hat{v}_{Db}^{k+1} + \hat{v}_{Db}^{k}}{2} \right) \dfrac{T}{L_f} \qquad (61)$$

$$\hat{i}_{Lb}^{k+1} = \hat{i}_{Ib}^{k+1} - \hat{i}_{Cb}^{k+1}$$

$$\hat{v}_{Lb}^{k+1} = \dfrac{2L_f - \gamma_L T}{\gamma_L T + 2L_f} \hat{v}_{Lb}^{k-1} + \dfrac{2\gamma_L L_f}{\gamma_L T + 2L_f} \left( \hat{i}_{Lb}^{k+1} - \hat{i}_{Lb}^{k} \right) \qquad (62)$$

$$u_b^{k+1} = u_{reg\_b}^{k+1} \dfrac{2}{E_d} \left( \hat{v}_{Db}^{k+1} + \hat{v}_{Lb}^{k+1} \right) \qquad (63)$$

$$\hat{i}_{Ic}^{k+1} = \hat{i}_{Ic}^{k} + \left( \dfrac{E_d}{2} u_c^k - \dfrac{\hat{v}_{Dc}^{k+1} + \hat{v}_{Dc}^{k}}{2} \right) \dfrac{T}{L_f} \qquad (64)$$

$$\hat{i}_{Lbc}^{k+1} = \hat{i}_{Ibc}^{k+1} - \hat{i}_{Cbc}^{k+1}$$

$$\hat{v}_{Lc}^{k+1} = \dfrac{2L_f - \gamma_L T}{\gamma_L T + 2L_f} \hat{v}_{Lc}^{k-1} + \dfrac{2\gamma_L L_f}{\gamma_L T + 2L_f} \left( \hat{i}_{Lc}^{k+1} - \hat{i}_{Lc}^{k} \right) \qquad (65)$$

$$u_c^{k+1} = u_{reg\_c}^{k+1} \dfrac{2}{E_d} \left( \hat{v}_{Dc}^{k+1} + \hat{v}_{Lc}^{k+1} \right) \qquad (66)$$

Figure 7A:
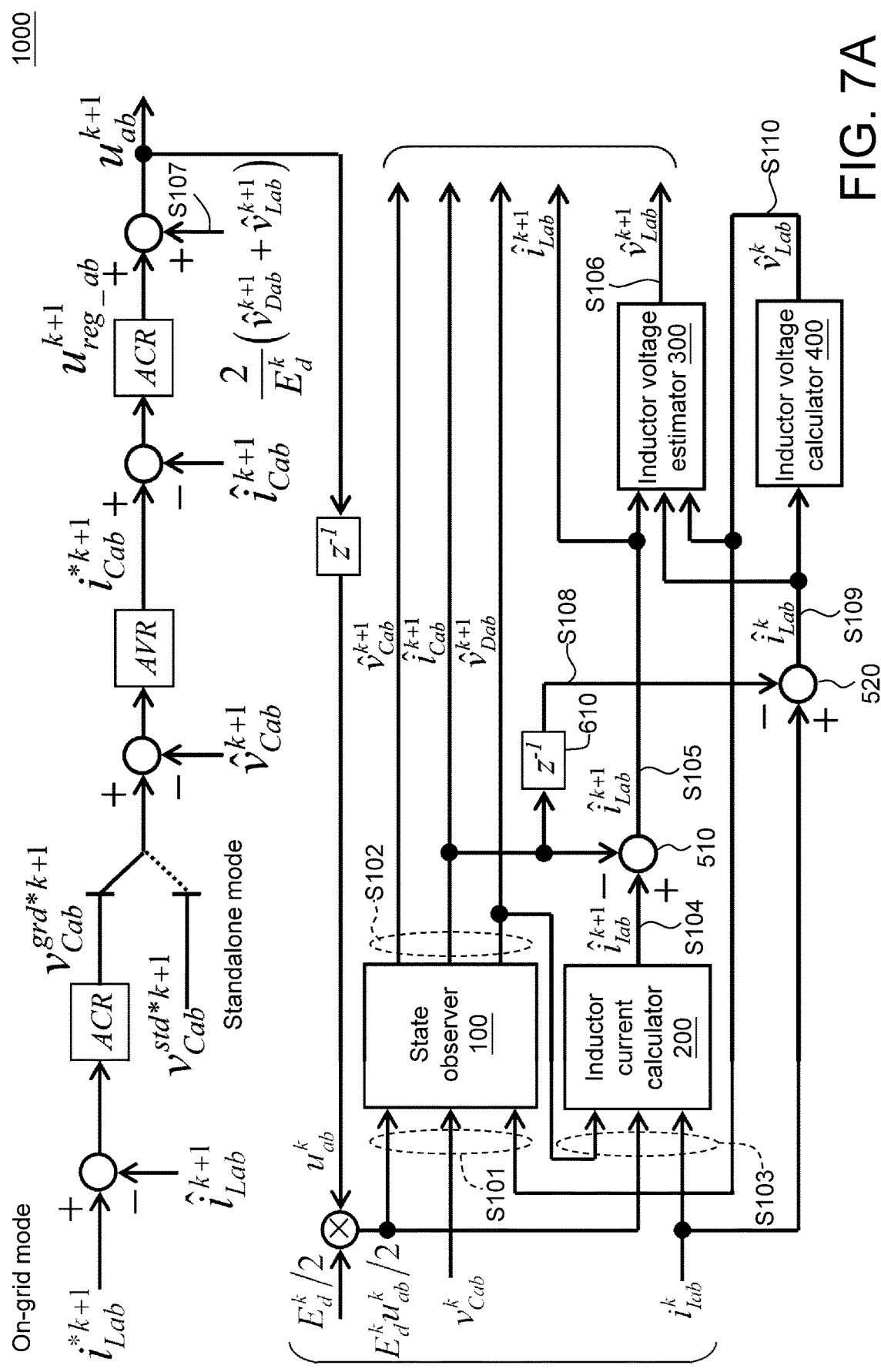
FIG. 7A shows a block diagram of the line element control system.
Figure 7B:
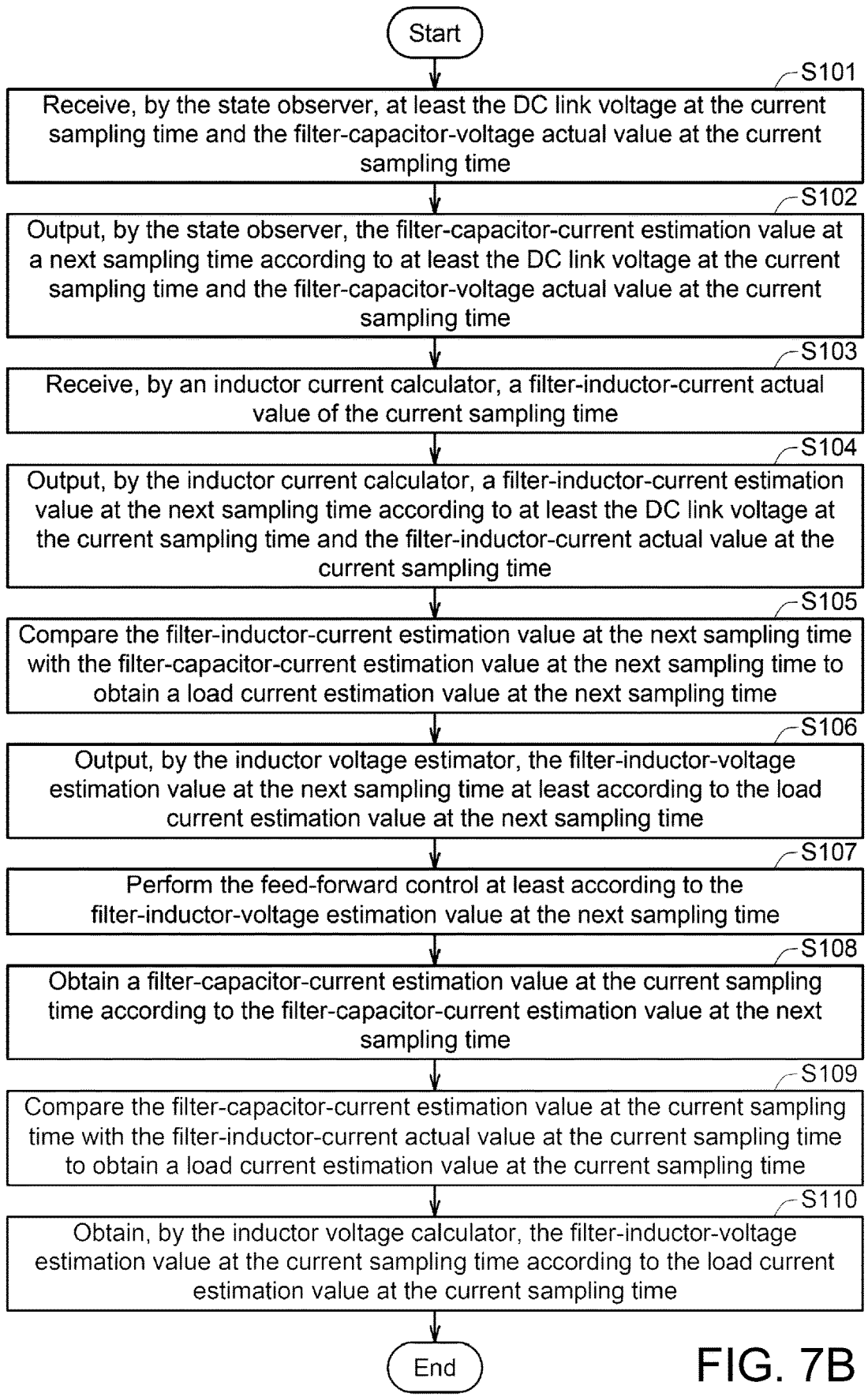
FIG. 7B shows a flowchart of a control method of the DC-AC inverter system according to an embodiment.

Please refer to FIGS. 7A and 7B. FIG. 7B shows a flowchart of a control method of the DC-AC inverter system 1000 according to an embodiment. FIG. 7A uses the ab line element as an example to illustrate, but it is not limited thereto. In step S101, the state observer 100 receives at least the DC link voltage at the current sampling time and the filter-capacitor-voltage actual value at the current sampling time. Taking FIG. 7A as an example, the state observer 100 receives the calculation result $E^k_d u^k_{ab}/2$ of the DC link voltage and system modulation index, the filter-capacitor-voltage actual value $v_{Cab}^{\ k}$ at the current sampling time and an filter-inductor-voltage estimation value $v_{Cab}^{\ k}$ at the current sampling time.

Then, in step S102, the state observer 100 outputs the filter-capacitor-current estimation value at a next sampling time according to at least the DC link voltage at the current sampling time and the filter-capacitor-voltage actual value at the current sampling time. The filter-capacitor-current estimation value at the next sampling time is an average current value without ripple. Taking FIG. 7A as an example, the state observer 100 outputs a filter-capacitor-voltage estimation value $\hat{v}_{Cab}^{\ k+1}$ at the next sampling time, the filter-capacitor-current estimation value $\hat{i}_{Cab}^{\ k+1}$ at the next sampling time and a disturbance-voltage estimation value $\hat{v}_{Dab}^{\ k+1}$ at the next sampling time according to the calculation result $E^k_d u^k_{ab}/2$ of the DC link voltage at the current sampling time and the system modulation index, the filter-capacitor-voltage actual value $v_{Cab}^{\ k}$ at the current sampling time and the filter-inductor-voltage estimation value $\hat{v}_{Lab}^{\ k}$ at the current sampling time. The filter-capacitor-current estimation value at the next sampling time is an average current value without ripple.

Then, in step S103, an inductor current calculator 200 receives a filter-inductor-current actual value of the current sampling time. Taking FIG. 7A as an example, the inductor current calculator 200 receives a disturbance-voltage estimation value $\hat{v}_{Dab}^{\ k+1}$ at the next sampling time, the calculation result $E^k_d u^k_{ab}/2$ of the DC link voltage at the current sampling time and the system modulation index and the filter-inductor-current actual value $i_{Iab}^{\ k}$ at the current sampling time.

Next, in step S104, the inductor current calculator 200 outputs a filter-inductor-current estimation value at the next sampling time according to at least the DC link voltage at the current sampling time and the filter-inductor-current actual value at the current sampling time. Taking FIG. 7A as an example, the inductor current calculator 200 outputs the filter-inductor-current estimation value $\hat{i}_{Iab}^{\ k+1}$ according to a disturbance-voltage estimation value $\hat{v}_{Dab}^{\ k+1}$ at the next sampling time, the calculation result $E^k_d u^k_{ab}/2$ of the DC link voltage at the current sampling time and the system modulation index and the filter-inductor-current actual value $i_{Iab}^{\ k}$ at the current sampling time.

Afterwards, in step S105, the filter-inductor-current estimation value at the next sampling time is compared with the filter-capacitor-current estimation value at the next sampling time to obtain a load current estimation value at the next sampling time. Taking FIG. 7A as an example, the first comparator 510 compares the filter-inductor-current estimation value $\hat{i}_{Iab}^{\ k+1}$ at the next sampling time with the filter-capacitor-current estimation value $\hat{i}_{Cab}^{\ k+1}$ at the next sampling time to obtain the load current estimation value $\hat{i}_{Lab}^{\ k+1}$ at the next sampling time.

Then, in step S106, the inductor voltage estimator 300 outputs the filter-inductor-voltage estimation value at the next sampling time at least according to the load current estimation value at the next sampling time. Taking FIG. 7A as an example, the inductor voltage estimator 300 outputs the filter-inductor-voltage estimation value $\hat{v}_{Lab}^{\ k+1}$ at the next sampling time according to the load current estimation value $\hat{i}_{Lab}^{\ k+1}$ at the next sampling time, a load current estimation value $\hat{i}_{Lab}^{\ k+1}$ at the current sampling time and the filter-inductor-voltage estimation value $\hat{v}_{Lab}^{\ k}$ at the current sampling time.

Next, in step S107, the feed-forward control is performed at least according to the filter-inductor-voltage estimation value at the next sampling time. Taking FIG. 7A as an example, the DC-AC inverter system 1000 performs the feed-forward control according to the DC link voltage $E^k_d$ at the current sampling time, a disturbance-voltage estimation value $\hat{v}_{Dab}^{\ k+1}$ at the next sampling time and the filter-inductor-voltage estimation value $\hat{v}_{Lab}^{\ k+1}$ at the next sampling time. The filter-inductor-voltage estimation value $\hat{v}_{Lab}^{\ k+1}$ at the next sampling time is used to compensate the feed-forward control.

Through the inductor voltage feed-forward compensation optimization technology described in the above steps S101 to S107, the total harmonic distortion of the voltage can be effectively reduced. According to the experimental results, in the standalone mode, the total harmonic distortion of the voltage can be reduced by 2.5%.

In addition, in the step of obtaining the load current estimation value $\hat{i}_{Lab}{}^{k+1}$ at the next sampling time described in the above step S105, the load current estimation value $\hat{i}_{Lab}{}^{k+1}$ at the next sampling time can be obtained without using the load current sensor. This step is not affected by temperature and component damage, so it can not only reduce the construction cost, but also improve the system reliability.

Then, in step S108, a filter-capacitor-current estimation value at the current sampling time is obtained according to the filter-capacitor-current estimation value at the next sampling time. Taking FIG. 7A as an example, the delay calculator 610 obtains a filter-capacitor-current estimation value $\hat{i}_{Cab}{}^{k}$ at the current sampling time according to the filter-capacitor-current estimation value $\hat{i}_{Cab}{}^{k+1}$ at the next sampling time.

Next, in step S109, the filter-capacitor-current estimation value at the current sampling time is compared with the filter-inductor-current actual value at the current sampling time to obtain a load current estimation value at the current sampling time. Taking FIG. 7A as an example, the second comparator 520 compares the filter-capacitor-current estimation value $\hat{i}_{Cab}{}^{k}$ at the current sampling time with the filter-inductor-current actual value $\hat{i}_{lab}{}^{k}$ at the current sampling time to obtain the load current estimation value $\hat{i}_{Lab}{}^{k}$ at the current sampling time.

Then, in step S110, the inductor voltage calculator 400 obtains the filter-inductor-voltage estimation value at the current sampling time according to the load current estimation value at the current sampling time. Taking FIG. 7A as an example, the inductor voltage calculator 400 obtains the filter-inductor-voltage estimation value $\hat{v}_{Lab}{}^{k}$ at the current sampling time according to the load current estimation value $\hat{i}_{Lab}{}^{k}$ at the current sampling time. The filter-inductor-voltage estimation value $\hat{v}_{Lab}{}^{k}$ is used to feedback to the state observer 100 to perform the above step S102.

Through the above steps S108 to S110, the state observer 100 is introduced into the inductor voltage, so that the accuracy of the state observer 100 can be improved.

In addition, in the above technology using the state observer 100, the estimated value at the next sampling time can be directly obtained, so it can improve the ripples and control time delay problems during capacitor current feedback, and improve the performance of single-phase or three-phase systems.

Figure 8:
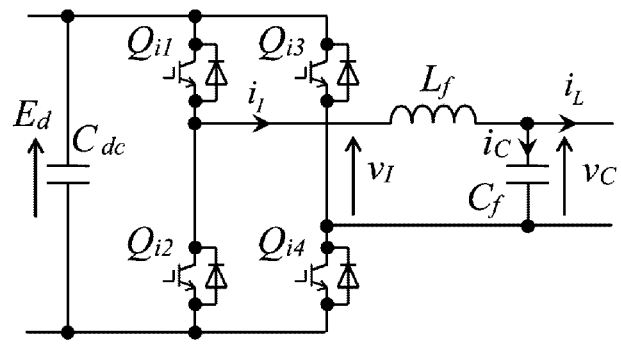
FIG. 8 illustrates a single-phase DC-AC inverter according to an embodiment.

Please refer to FIG. 8, which illustrates a single-phase DC-AC inverter according to an embodiment. $v_f = E_d u$. The derivation processes of other elements are the same as that of the line element control and the phase element control of the three-phase DC-AC inverter system. The obtained single-phase DC-AC inverter system state observer equations are shown in the equations (67) to (71). The equations for the feed-forward compensation control calculation of the single-phase DC-AC inverter system are as shown in the equations (72) to (74).

$$\hat{i}_I^k = \hat{i}_I^{k-1} + \left(E_d u^{k-1} - \frac{\hat{v}_D^k + \hat{v}_D^{k-1}}{2}\right)\frac{T}{L_f} \quad (67)$$

$$\hat{i}_L^k = \hat{i}_I^k - \hat{i}_C^k$$

$$\hat{v}_L^{k+1} = \frac{2L_f - \gamma_L T}{\gamma_L T + 2L_f}\hat{v}_L^{k-1} + \frac{2\gamma_L L_f}{\gamma_L T + 2L_f}\left(\hat{i}_L^{k+1} - \hat{i}_L^k\right) \quad (68)$$

$$u_x^k = E_d u^k - \hat{v}_L^k \quad (69)$$

$$\begin{pmatrix}\hat{v}_C^{k+1}\\\hat{i}_C^{k+1}\\\hat{v}_D^{k+1}\end{pmatrix} = \begin{pmatrix}1 & Z_f\sin\omega_f T & \cos\omega_f T - 1\\0 & \cos\omega_f T & -\frac{\sin\omega_f T}{Z_f}\\0 & Z_f\sin\omega_f T & \cos\omega_f T\end{pmatrix}\begin{pmatrix}\hat{v}_C^k\\\hat{i}_C^k\\\hat{v}_D^k\end{pmatrix} + \quad (70)$$

$$\begin{pmatrix}1 - \cos\omega_f T\\\frac{\sin\omega_f T}{Z_f}\\1 - \cos\omega_f T\end{pmatrix}u_x^k + \begin{pmatrix}K_1\\K_2\\K_3\end{pmatrix}(v_C^k - \hat{v}_C^k)$$

$$K = \begin{pmatrix}K_1\\K_2\\K_3\end{pmatrix} = \quad (71)$$

$$\left(1 + 2\cos\omega_f T\,\frac{4\cos^2\omega_f T + 2\cos\omega_f T - 1}{2Z_f\sin\omega_f T}\,\frac{2\cos\omega_f T - 4\cos^2\omega_f T + 1}{2(1-\cos\omega_f T)}\right)^T$$

$$\hat{i}_I^{k+1} = \hat{i}_I^k + \left(E_d u^k - \frac{\hat{v}_D^{k+1} + \hat{v}_D^k}{2}\right)\frac{T}{L_f} \quad (72)$$

$$\hat{i}_L^{k+1} = \hat{i}_I^{k+1} - \hat{i}_C^{k+1}$$

$$\hat{v}_L^{k+1} = \frac{2L_f - \gamma_L T}{\gamma_L T + 2L_f}\hat{v}_L^k + \frac{2\gamma_L L_f}{\gamma_L T + 2L_f}\left(\hat{i}_L^{k+1} - \hat{i}_L^k\right) \quad (73)$$

$$u^{k+1} = u_{reg}^{k+1} + \frac{\hat{v}_D^{k+1} + \hat{v}_L^{k+1}}{E_d} \quad (74)$$

In the present disclosure, the D-Q axis element control of the three-phase DC-AC inverter system is also deduced below. The D-axis elements and the Q-axis elements of the D-Q elements can be obtained by converting the a-phase elements, the b-phase elements, the c-phase elements and the relation equation (75). According to the circuit principle of the equation (6) and the equation (75). the D-Q axis element state equations obtained by conversion are shown in the equations (76) to (78).

$$\begin{pmatrix}d\\q\end{pmatrix} = \sqrt{\frac{2}{3}}\begin{pmatrix}\cos\theta & \cos(\theta - 2\pi/3) & \cos(\theta + 2\pi/3)\\\sin\theta & \sin(\theta - 2\pi/3) & \sin(\theta + 2\pi/3)\end{pmatrix}\begin{pmatrix}a\\b\\c\end{pmatrix} \quad (75)$$

$$\frac{d}{dt}\begin{pmatrix}i_{Cd}\\i_{Cq}\end{pmatrix} = \begin{pmatrix}0 & -\omega\\\omega & 0\end{pmatrix}\begin{pmatrix}i_{Cd}\\i_{Cq}\end{pmatrix} - \frac{1}{L_f}\begin{pmatrix}v_{Cd}\\v_{Cq}\end{pmatrix} + \frac{1}{L_f}\left[\begin{pmatrix}v_{Id}\\v_{Iq}\end{pmatrix} - \begin{pmatrix}v_{Ld}\\v_{Lq}\end{pmatrix}\right] \quad (76)$$

$$\frac{d}{dt}\begin{pmatrix}i_{Id}\\i_{Iq}\end{pmatrix} = \begin{pmatrix}0 & -\omega\\\omega & 0\end{pmatrix}\begin{pmatrix}i_{Id}\\i_{Iq}\end{pmatrix} - \frac{1}{L_f}\begin{pmatrix}v_{Cd}\\v_{Cq}\end{pmatrix} + \frac{1}{L_f}\begin{pmatrix}v_{Id}\\v_{Iq}\end{pmatrix} \quad (77)$$

$$\frac{d}{dt}\begin{pmatrix}i_{Ld}\\i_{Lq}\end{pmatrix} = \begin{pmatrix}0 & -\omega\\\omega & 0\end{pmatrix}\begin{pmatrix}i_{Ld}\\i_{Lq}\end{pmatrix} + \frac{1}{L_f}\begin{pmatrix}v_{Ld}\\v_{Lq}\end{pmatrix}$$

$$\frac{d}{dt}\begin{pmatrix}v_{Cd}\\v_{Cq}\end{pmatrix} = \begin{pmatrix}0 & -\omega\\\omega & 0\end{pmatrix}\begin{pmatrix}v_{Cd}\\v_{Cq}\end{pmatrix} + \frac{1}{C_f}\begin{pmatrix}i_{Cd}\\i_{Cq}\end{pmatrix} \quad (78)$$

$$\begin{pmatrix}i_{Cd}\\i_{Cq}\end{pmatrix} = \begin{pmatrix}i_{Id}\\i_{Iq}\end{pmatrix} - \begin{pmatrix}i_{Ld}\\i_{Lq}\end{pmatrix}$$

Figure 9:
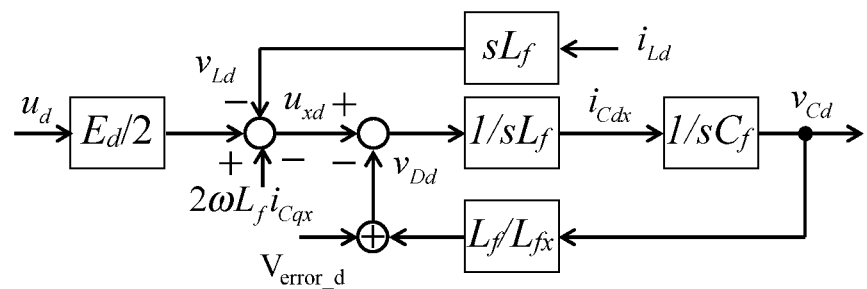
FIG. 9 illustrates a D-Q axis element DC-AC inverter model according to an embodiment.

The new parameter symbols $i_{Cdx}$ and $i_{Cqx}$ are defined and the definitions are shown in the equation (79). The state equations are written as the equations (80) and (81). The equation (82) can be obtained after considering the dead time, the inductor resistance and the voltage error components. $v_\alpha$ is the voltage error of the uncertain component including the coupling factor. The newly added consideration components are then represented by the disturbance voltage, as shown in the equation (83). The equation (82) can be rearranged as the equations (84) and (85). In addition, assuming that within one sample, the voltage error compensation is constant and smaller than the capacitor voltage, it can be expressed as the equation (86). Finally, the obtained relational expressions are organized as the equations (87) and (88), which are the state equations of the continuous time domain system with the capacitor voltage, the capacitor current and the disturbance voltage as the state variables. For the D-axis elements, the relation is shown as the equation (89). Please refer to FIG. 9, which illustrates a D-Q axis element DC-AC inverter model according to an embodiment. The equation (89) can be converted into a graphical DC-AC inverter model, as shown in FIG. 9.

$$\begin{pmatrix} i_{Cdx} \\ i_{Cqx} \end{pmatrix} = \begin{pmatrix} i_{Cd} \\ i_{Cq} \end{pmatrix} + \begin{pmatrix} 0 & -\omega C_f \\ \omega C_f & 0 \end{pmatrix} \begin{pmatrix} v_{Cd} \\ v_{Cq} \end{pmatrix} \quad (79)$$

$$\frac{d}{dt}\begin{pmatrix} v_{Cd} \\ v_{Cq} \end{pmatrix} = \frac{1}{C_f}\begin{pmatrix} i_{Cdx} \\ i_{Cqx} \end{pmatrix}$$

$$\frac{d}{dt}\begin{pmatrix} i_{Cdx} \\ i_{Cqx} \end{pmatrix} = \quad (80)$$

$$-\frac{1-\omega^2 L_f C_f}{L_f}\begin{pmatrix} v_{Cd} \\ v_{Cq} \end{pmatrix} + \frac{1}{L_f}\left[\begin{pmatrix} v_{Id} \\ v_{Iq} \end{pmatrix} - \begin{pmatrix} v_{Ld} \\ v_{Lq} \end{pmatrix}\right] + \begin{pmatrix} 0 & -2\omega \\ 2\omega & 0 \end{pmatrix}\begin{pmatrix} i_{Cdx} \\ i_{Cqx} \end{pmatrix}$$

$$\frac{d}{dt}\begin{pmatrix} i_{Cdx} \\ i_{Cqx} \end{pmatrix} = -\frac{1}{L_{fx}}\begin{pmatrix} v_{Cd} \\ v_{Cq} \end{pmatrix} + \frac{E_d}{2L_f}\begin{pmatrix} u_d \\ u_q \end{pmatrix} - \frac{1}{L_f}\begin{pmatrix} v_{Ld} \\ v_{Lq} \end{pmatrix} + \begin{pmatrix} 0 & -2\omega \\ 2\omega & 0 \end{pmatrix}\begin{pmatrix} i_{Cdx} \\ i_{Cqx} \end{pmatrix} \quad (81)$$

$$L_{fx} = \frac{L_f}{1-\omega^2 L_f C_f}$$

$$\frac{d}{dt}\begin{pmatrix} i_{Cdx} \\ i_{Cqx} \end{pmatrix} = \frac{E_d}{2L_f}\begin{pmatrix} u_d + U_{DTd} \\ u_q + U_{DTq} \end{pmatrix} - \quad (82)$$

$$\frac{1}{L_{fx}}\begin{pmatrix} v_{Cd} \\ v_{Cq} \end{pmatrix} - \frac{1}{L_f}\begin{pmatrix} v_{Ld} \\ v_{Lq} \end{pmatrix} + \begin{pmatrix} 0 & -2\omega \\ 2\omega & 0 \end{pmatrix}\begin{pmatrix} i_{Cdx} \\ i_{Cqx} \end{pmatrix} - \frac{1}{L_f}\begin{pmatrix} v_{ad} \\ v_{aq} \end{pmatrix}$$

$$\frac{d}{dt}\begin{pmatrix} v_{Cd} \\ v_{Cq} \end{pmatrix} = \frac{1}{C_f}\begin{pmatrix} i_{Cdx} \\ i_{Cqx} \end{pmatrix}$$

$$\begin{pmatrix} v_{Dd} \\ v_{Dq} \end{pmatrix} = \frac{L_f}{L_{fx}}\begin{pmatrix} v_{Cd} \\ v_{Cq} \end{pmatrix} - \frac{E_d}{2}\begin{pmatrix} U_{DTd} \\ U_{DTq} \end{pmatrix} + \begin{pmatrix} v_{ad} \\ v_{aq} \end{pmatrix} = \frac{L_f}{L_{fx}}\begin{pmatrix} v_{Cd} \\ v_{Cq} \end{pmatrix} + \begin{pmatrix} v_{error\_d} \\ v_{error\_q} \end{pmatrix} \quad (83)$$

$$\begin{pmatrix} v_{error\_d} \\ v_{error\_q} \end{pmatrix} = -\frac{E_d}{2}\begin{pmatrix} U_{DTd} \\ U_{DTq} \end{pmatrix} + \begin{pmatrix} v_{ad} \\ v_{aq} \end{pmatrix}$$

$$\frac{d}{dt}\begin{pmatrix} i_{Cdx} \\ i_{Cqx} \end{pmatrix} = \frac{E_d}{2L_f}\begin{pmatrix} u_d \\ u_q \end{pmatrix} - \frac{1}{L_f}\begin{pmatrix} v_{Dd} \\ v_{Dq} \end{pmatrix} - \frac{1}{L_f}\begin{pmatrix} v_{Ld} \\ v_{Lq} \end{pmatrix} + \begin{pmatrix} 0 & -2\omega \\ 2\omega & 0 \end{pmatrix}\begin{pmatrix} i_{Cdx} \\ i_{Cqx} \end{pmatrix} = \quad (84)$$

$$\frac{1}{L_f}\begin{pmatrix} u_{xd} \\ u_{xq} \end{pmatrix} - \frac{1}{L_f}\begin{pmatrix} v_{Dd} \\ v_{Dq} \end{pmatrix}$$

$$\begin{pmatrix} u_{xd} \\ u_{xq} \end{pmatrix} = \frac{E_d}{2}\begin{pmatrix} u_d \\ u_q \end{pmatrix} - \begin{pmatrix} v_{Ld} \\ v_{Lq} \end{pmatrix} + \begin{pmatrix} 0 & -2\omega L_f \\ 2\omega L_f & 0 \end{pmatrix}\begin{pmatrix} i_{Cdx} \\ i_{Cqx} \end{pmatrix} \quad (85)$$

$$\frac{d}{dt}\begin{pmatrix} v_{Dd} \\ v_{Dq} \end{pmatrix} = \frac{L_f}{L_{fx}}\frac{d}{dt}\begin{pmatrix} v_{Cd} \\ v_{Cq} \end{pmatrix} + \frac{d}{dt}\begin{pmatrix} v_{error\_d} \\ v_{error\_q} \end{pmatrix} \quad (86)$$

$$\frac{d}{dt}\begin{pmatrix} v_{error\_d} \\ v_{error\_q} \end{pmatrix} = 0$$

$$\frac{d}{dt}\begin{pmatrix} v_{Dd} \\ v_{Dq} \end{pmatrix} = \frac{L_f}{L_{fx}}\frac{d}{dt}\begin{pmatrix} v_{Cd} \\ v_{Cq} \end{pmatrix}$$

$$\frac{d}{dt}\begin{pmatrix} v_{Cd} \\ i_{Cdx} \\ v_{Dd} \end{pmatrix} = \begin{pmatrix} 0 & 1/C_f & 0 \\ 0 & 0 & -1/L_f \\ 0 & L_f/L_{fx}C_f & 0 \end{pmatrix}\begin{pmatrix} v_{Cd} \\ i_{Cdx} \\ v_{Dd} \end{pmatrix} + \begin{pmatrix} 0 \\ 1/L_f \\ 0 \end{pmatrix} u_{xd} \quad (87)$$

$$\frac{d}{dt}\begin{pmatrix} v_{Cd} \\ i_{Cdx} \\ v_{Dq} \end{pmatrix} = \begin{pmatrix} 0 & 1/C_f & 0 \\ 0 & 0 & -1/L_f \\ 0 & L_f/L_{fx}C_f & 0 \end{pmatrix}\begin{pmatrix} v_{Cq} \\ i_{Cqx} \\ v_{Dq} \end{pmatrix} + \begin{pmatrix} 0 \\ 1/L_f \\ 0 \end{pmatrix} u_{xq} \quad (88)$$

$$\frac{di_{Cdx}}{dt} = \frac{u_{xd} - v_{Dd}}{L_f} \quad (89)$$

$$\frac{dv_{Cd}}{dt} = \frac{1}{C_f} i_{Cdx}$$

$$u_{xd} = \frac{E_d}{2} u_d - v_{Ld} - 2\omega L_f i_{Cqx}$$

$$v_{Dd} = \frac{L_f}{L_{fx}} v_{Cd} + v_{error\_d}$$

$$\frac{dv_{Dd}}{dt} \approx \frac{L_f}{L_{fx}} \frac{dv_{Cd}}{dt}$$

Next, the derivation is explained with the D-axis elements. The equation (87) is compared with the open-loop state observer equation and the equation (90) is obtained. $A_d$, $B_d$ and $C_d$ shown in the equation (91) can be obtained by using the state transformation equation (16) and the Laplace transformation method. Then, the open-loop state observer equations converted into discrete types can be obtained, such as the equations (92) and (93).

$$\dot{x} = Ax + Bu_x \quad (90)$$

$$y = Cx$$

$$A = \begin{pmatrix} 0 & 1/C_f & 0 \\ 0 & 0 & -1/L_f \\ 0 & L_f/L_{fx}C_f & 0 \end{pmatrix}$$

$$B = \begin{pmatrix} 0 \\ 1/L_f \\ 0 \end{pmatrix}$$

$$A_d = \begin{pmatrix} 1 & Z_{fx}\sin\omega_{fx}T & -\frac{L_{fx}}{L_f}(1-\cos\omega_{fx}T) \\ 0 & \cos\omega_{fx}T & -\frac{1}{\omega_{fx}L_f}\sin\omega_{fx}T \\ 0 & \omega_{fx}L_f\sin\omega_{fx}T & \cos\omega_{fx}T \end{pmatrix} \quad (91)$$

$$B_d = \begin{pmatrix} \frac{L_{fx}}{L_f}(1-\cos\omega_{fx}T) \\ \frac{1}{\omega_{fx}L_f}\sin\omega_{fx}T \\ (1-\cos\omega_{fx}T) \end{pmatrix}$$

$$C_d = (1 \ 0 \ 0)$$

$$\begin{pmatrix} v_{Cd}^{k+1} \\ i_{Cdx}^{k+1} \\ v_{Dd}^{k+1} \end{pmatrix} = \begin{pmatrix} 1 & Z_{fx}\sin\omega_{fx}T & -\frac{L_{fx}}{L_f}(1-\cos\omega_{fx}T) \\ 0 & \cos\omega_{fx}T & -\frac{L_{fx}}{L_f}\frac{\sin\omega_{fx}T}{Z_{fx}} \\ 0 & \frac{L_f}{L_{fx}}Z_{fx}\sin\omega_{fx}T & \cos\omega_{fx}T \end{pmatrix}\begin{pmatrix} v_{Cd}^k \\ i_{Cdx}^k \\ v_{Dd}^k \end{pmatrix} + \quad (92)$$

$$\begin{pmatrix} \frac{L_{fx}}{L_f}(1-\cos\omega_{fx}T) \\ \frac{L_{fx}}{L_f}\frac{\sin\omega_{fx}T}{Z_{fx}} \\ (1-\cos\omega_{fx}T) \end{pmatrix}$$

$$\omega_{fx} = \sqrt{\frac{1}{L_{fx}C_f}}$$

$$Z_{fx} = \sqrt{\frac{L_{fx}}{C_f}}$$

$$\omega_{fx} L_{fx} = \sqrt{\frac{L_{fx}}{C_f}} = Z_{fx}$$

$$\omega_{fx} = \frac{Z_{fx}}{L_{fx}} \quad (93)$$

Taking $v_C$ as the feedback parameter, the equation of the discrete-type closed-loop state observer is shown in the equation (20). The Deadbeat Control Law is used and $A_d - KC_d$ is set to zero to obtain the gain term K, the calculation results are as in the equation (94) and the equation (95). Finally, the discrete closed-loop state observer equations are obtained as the equations (96) and (97). The equation (97) is derived from the equation (98).

$$K_1 = 1 + 2\cos\omega_{fx} T \quad (94)$$

$$K_2 = \frac{2\cos\omega_{fx} T + 4\cos^2\omega_{fx} T - 1}{2Z_{fx} \sin\omega_{fx} T}$$

$$K_3 = \frac{2\cos\omega_{fx} T - 4\cos^2\omega_{fx} T + 1}{\frac{2L_{fx}}{L_f}(1 - \cos\omega_{fx} T)}$$

$$K = \left( 1 + 2\cos\omega_{fx} T \quad \frac{2\cos\omega_{fx} T + 4\cos^2\omega_{fx} T - 1}{2Z_{fx} \sin\omega_{fx} T} \quad \frac{2\cos\omega_{fx} T - 4\cos^2\omega_{fx} T + 1}{\frac{2L_{fx}}{L_f}(1 - \cos\omega_{fx} T)} \right)^T \quad (95)$$

$$\begin{pmatrix} \hat{v}_{Cd}^{k+1} \\ \hat{i}_{Cdx}^{k+1} \\ \hat{v}_{Dd}^{k+1} \end{pmatrix} = \begin{pmatrix} 1 & Z_{fx} \sin\omega_{fx} T & -\frac{L_{fx}}{L_f}(1 - \cos\omega_{fx} T) \\ 0 & \cos\omega_{fx} T & -\frac{L_{fx}}{L_f}\frac{\sin\omega_{fx} T}{Z_{fx}} \\ 0 & \frac{L_f}{L_{fx}} Z_{fx} \sin\omega_{fx} T & \cos\omega_{fx} T \end{pmatrix} \begin{pmatrix} \hat{v}_{Cd}^k \\ \hat{i}_{Cdx}^k \\ \hat{v}_{Dd}^k \end{pmatrix} + \quad (96)$$

$$\begin{pmatrix} \frac{L_{fx}}{L_f}(1 - \cos\omega_{fx} T) \\ \frac{L_{fx}}{L_f}\frac{\sin\omega_{fx} T}{Z_{fx}} \\ (1 - \cos\omega_{fx} T) \end{pmatrix} u_{xd}^k + \begin{pmatrix} K_1 \\ K_2 \\ K_3 \end{pmatrix} (v_{Cd}^k - \hat{v}_{Cd}^k)$$

$$\begin{pmatrix} u_{xd} \\ u_{xq} \end{pmatrix} = \frac{E_d}{2}\begin{pmatrix} u_d \\ u_q \end{pmatrix} - \begin{pmatrix} v_{Ld} \\ v_{Lq} \end{pmatrix} + \begin{pmatrix} 0 & -2\omega L_f \\ 2\omega L_f & 0 \end{pmatrix}\begin{pmatrix} i_{Cdx} \\ i_{Cqx} \end{pmatrix} \approx \quad (97)$$

$$\frac{L_f}{L_{fx}}\begin{pmatrix} v_{Cd} \\ v_{Cq} \end{pmatrix} + \begin{pmatrix} 0 & -\omega L_f \\ \omega L_f & 0 \end{pmatrix}\begin{pmatrix} i_{Cdx} \\ i_{Cqx} \end{pmatrix}$$

$$\frac{E_d}{2}\begin{pmatrix} u_d \\ u_q \end{pmatrix} - \begin{pmatrix} v_{Ld} \\ v_{Lq} \end{pmatrix} = \begin{pmatrix} v_{Cd} \\ v_{Cq} \end{pmatrix} - \begin{pmatrix} 0 & -\omega L_f \\ \omega L_f & 0 \end{pmatrix}\begin{pmatrix} i_{Cd} \\ i_{Cq} \end{pmatrix} + L_f \frac{d}{dt}\begin{pmatrix} i_{Cd} \\ i_{Cq} \end{pmatrix} = \quad (98)$$

$$\frac{L_f}{L_{fx}}\begin{pmatrix} v_{Cd} \\ v_{Cq} \end{pmatrix} - \begin{pmatrix} 0 & -\omega L_f \\ \omega L_f & 0 \end{pmatrix}\begin{pmatrix} i_{Cdx} \\ i_{Cqx} \end{pmatrix} + L_f \frac{d}{dt}\begin{pmatrix} i_{Cd} \\ i_{Cq} \end{pmatrix}$$

Regarding the load current estimation value, the load current at the current sampling time can be obtained from the equation (99). Regarding the filter-inductor-current estimation value, the equation (100) is the inductor current continuity time-domain state equation and the discrete transformation required for the calculation. The obtained discrete state equation of the inductor current is shown as in the equation (101), and finally the load current estimation value at the next sampling time can be obtained through the equation (102).

$$\begin{pmatrix} \hat{i}_{Ld}^k \\ \hat{i}_{Lq}^k \end{pmatrix} = \begin{pmatrix} \hat{i}_{Id}^k \\ \hat{i}_{Iq}^k \end{pmatrix} - \begin{pmatrix} \hat{i}_{Cd}^k \\ \hat{i}_{Cd}^k \end{pmatrix} = \begin{pmatrix} \hat{i}_{Id}^k \\ \hat{i}_{Iq}^k \end{pmatrix} - \begin{pmatrix} \hat{i}_{Cdx}^k \\ \hat{i}_{Cdx}^k \end{pmatrix} + \begin{pmatrix} 0 & -\omega C_f \\ \omega C_f & 0 \end{pmatrix}\begin{pmatrix} \hat{v}_{Cd}^k \\ \hat{v}_{Cq}^k \end{pmatrix} \quad (99)$$

$$\frac{d}{dt}\begin{pmatrix} i_{Id} \\ i_{Iq} \end{pmatrix} = \begin{pmatrix} 0 & -\omega \\ \omega & 0 \end{pmatrix}\begin{pmatrix} i_{Id} \\ i_{Iq} \end{pmatrix} - \frac{1}{L_f}\begin{pmatrix} v_{Cd} \\ v_{Cq} \end{pmatrix} + \frac{E_d}{2L_f}\begin{pmatrix} u_d \\ u_q \end{pmatrix} \quad (100)$$

$$A_d = e^{AT} = \begin{pmatrix} \cos\omega T & -\sin\omega T \\ \sin\omega T & \cos\omega T \end{pmatrix}$$

$$B_d = \int_0^T e^{AT} B d\tau = \begin{pmatrix} \frac{\sin\omega T}{\omega} \\ \frac{\sin\omega T}{\omega} \end{pmatrix}$$

$$\begin{pmatrix} \hat{i}_{Id}^{k+1} \\ \hat{i}_{Iq}^{k+1} \end{pmatrix} = \begin{pmatrix} \cos\omega T & -\sin\omega T \\ \sin\omega T & \cos\omega T \end{pmatrix}\begin{pmatrix} \hat{i}_{Id}^k \\ \hat{i}_{Iq}^k \end{pmatrix} + \frac{\sin\omega T}{\omega L_f}\begin{pmatrix} \frac{E_d}{2} u_d^k - v_{Cd}^k \\ \frac{E_d}{2} u_q^k - v_{Cq}^k \end{pmatrix} \quad (101)$$

$$\begin{pmatrix} \hat{i}_{Ld}^{k+1} \\ \hat{i}_{Lq}^{k+1} \end{pmatrix} = \begin{pmatrix} \hat{i}_{Id}^{k+1} \\ \hat{i}_{Iq}^{k+1} \end{pmatrix} - \begin{pmatrix} \hat{i}_{Cdx}^{k+1} \\ \hat{i}_{Cqx}^{k+1} \end{pmatrix} + \begin{pmatrix} 0 & -\omega C_f \\ \omega C_f & 0 \end{pmatrix}\begin{pmatrix} \hat{v}_{Cd}^{k+1} \\ \hat{v}_{Cq}^{k+1} \end{pmatrix} \quad (102)$$

Figure 10:
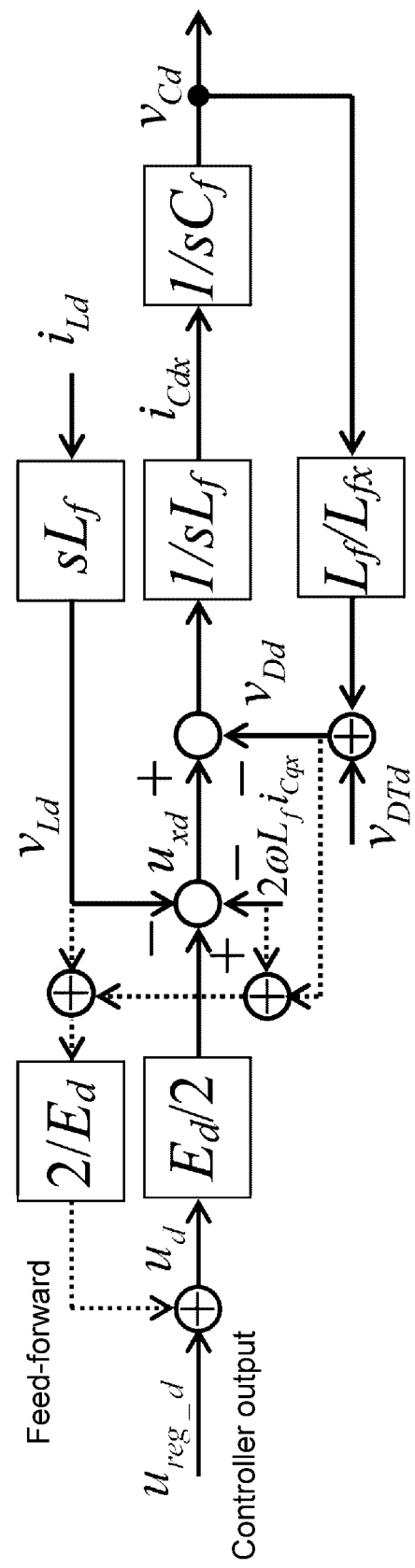
FIG. 10 illustrates a D-Q axis element DC-AC inverter model according to another embodiment.

Regarding the calculation of the inductor voltage, the equation (103) is the continuous state relationship of the inductor voltage. Using the high frequency limiter and the bilinear conversion method, the discrete state equation of the inductor voltage can be obtained as the equation (104). Please refer to FIG. 10, which illustrates a D-Q axis element DC-AC inverter model according to another embodiment. As shown in the DC-AC inverter model of FIG. 10, it can be known that the feed-forward compensation control calculation is shown as the equation (105).

$$\begin{pmatrix} v_{Ld} \\ v_{Lq} \end{pmatrix} = L_f \frac{d}{dt}\begin{pmatrix} i_{Ld} \\ i_{Lq} \end{pmatrix} + \begin{pmatrix} 0 & -\omega L_f \\ \omega L_f & 0 \end{pmatrix}\begin{pmatrix} i_{Ld} \\ i_{Lq} \end{pmatrix} \quad (103)$$

$$\begin{pmatrix} \hat{v}_{Ld}^{k+1} \\ \hat{v}_{Lq}^{k+1} \end{pmatrix} = \frac{2L_f - \gamma_L T}{\gamma_L T + 2L_f}\begin{pmatrix} \hat{v}_{Ld}^k \\ \hat{v}_{Lq}^k \end{pmatrix} + \frac{2\gamma_L L_f}{\gamma_L T + 2L_f}\begin{pmatrix} \hat{i}_{Ld}^{k+1} - \hat{i}_{Ld}^k \\ \hat{i}_{Lq}^{k+1} - \hat{i}_{Lq}^k \end{pmatrix} \quad (104)$$

$$\begin{pmatrix} \hat{v}_{Ld}^{k+1} \\ \hat{v}_{Lq}^{k+1} \end{pmatrix} = \begin{pmatrix} \hat{v}_{Ld}^{k+1} \\ \hat{v}_{Lq}^{k+1} \end{pmatrix} + \begin{pmatrix} 0 & -\omega L_f \\ \omega L_f & 0 \end{pmatrix}\begin{pmatrix} \hat{i}_{Ld}^{k+1} \\ \hat{i}_{Lq}^{k+1} \end{pmatrix}$$

$$u_d^{k+1} = u_{reg\_d}^{k+1} + \frac{2}{E_d}(\hat{v}_{Dd}^{k+1} + \hat{v}_{Ld}^{k+1} + 2\omega L_f \hat{i}_{Cqx}^{k+1}) \quad (105)$$

$$u_q^{k+1} = u_{reg\_q}^{k+1} + \frac{2}{E_d}(\hat{v}_{Dq}^{k+1} + \hat{v}_{Lq}^{k+1} - 2\omega L_f \hat{i}_{Cdx}^{k+1})$$

According to the above derivation process, the obtained state observer and the calculation of each parameter is summarized as below. The state observer equations of the D-Q axis elements are as shown in the equations (106) to (109), and the feed-forward compensation control calculation equations of the D-Q axis elements are as shown in the equations (110) to (113).

$$\begin{pmatrix} \hat{i}_{Ld}^k \\ \hat{i}_{Lq}^k \end{pmatrix} = \begin{pmatrix} \hat{i}_{Id}^k \\ \hat{i}_{Iq}^k \end{pmatrix} - \begin{pmatrix} \hat{i}_{Cdx}^k \\ \hat{i}_{Cqx}^k \end{pmatrix} + \begin{pmatrix} 0 & -\omega C_f \\ \omega C_f & 0 \end{pmatrix}\begin{pmatrix} \hat{v}_{Cd}^k \\ \hat{v}_{Cq}^k \end{pmatrix} \quad (106)$$

$$\begin{pmatrix} u_{xd}^k \\ u_{xq}^k \end{pmatrix} = \frac{L_f}{L_{fx}}\begin{pmatrix} \hat{v}_{Cd}^k \\ \hat{v}_{Cq}^k \end{pmatrix} + \begin{pmatrix} 0 & -\omega L_f \\ \omega L_f & 0 \end{pmatrix}\begin{pmatrix} \hat{i}_{Cdx}^k \\ \hat{i}_{Cqx}^k \end{pmatrix}$$

-continued $$\begin{pmatrix} \hat{v}_{Cd}^{k+1} \\ \hat{i}_{Cdx}^{k+1} \\ \hat{v}_{Dd}^{k+1} \end{pmatrix} = \begin{pmatrix} 1 & Z_{fx}\sin\omega_{fx}T & -\dfrac{L_{fx}}{L_f}(1-\cos\omega_{fx}T) \\ 0 & \cos\omega_{fx}T & -\dfrac{L_{fx}}{L_f}\dfrac{\sin\omega_{fx}T}{Z_{fx}} \\ 0 & \dfrac{L_f}{L_{fx}}Z_{fx}\sin\omega_{fx}T & \cos\omega_{fx}T \end{pmatrix} \begin{pmatrix} \hat{v}_{Cd}^{k} \\ \hat{i}_{Cdx}^{k} \\ \hat{v}_{Dd}^{k} \end{pmatrix} + \quad (107)$$

$$\begin{pmatrix} \dfrac{L_{fx}}{L_f}(1-\cos\omega_{fx}T) \\ \dfrac{L_{fx}}{L_f}\dfrac{\sin\omega_{fx}T}{Z_{fx}} \\ (1-\cos\omega_{fx}T) \end{pmatrix} u_{xd}^{k} + \begin{pmatrix} K_1 \\ K_2 \\ K_3 \end{pmatrix}(v_{Cd}^{k}-\hat{v}_{Cd}^{k})$$

$$\begin{pmatrix} \hat{v}_{Cq}^{k+1} \\ \hat{i}_{Cqx}^{k+1} \\ \hat{v}_{Dq}^{k+1} \end{pmatrix} = \begin{pmatrix} 1 & Z_{fx}\sin\omega_{fx}T & -\dfrac{L_{fx}}{L_f}(1-\cos\omega_{fx}T) \\ 0 & \cos\omega_{fx}T & -\dfrac{L_{fx}}{L_f}\dfrac{\sin\omega_{fx}T}{Z_{fx}} \\ 0 & \dfrac{L_f}{L_{fx}}Z_{fx}\sin\omega_{fx}T & \cos\omega_{fx}T \end{pmatrix} \begin{pmatrix} \hat{v}_{Cq}^{k} \\ \hat{i}_{Cqx}^{k} \\ \hat{v}_{Dq}^{k} \end{pmatrix} + \quad (108)$$

$$\begin{pmatrix} \dfrac{L_{fx}}{L_f}(1-\cos\omega_{fx}T) \\ \dfrac{L_{fx}}{L_f}\dfrac{\sin\omega_{fx}T}{Z_{fx}} \\ (1-\cos\omega_{fx}T) \end{pmatrix} u_{xq}^{k} + \begin{pmatrix} K_1 \\ K_2 \\ K_3 \end{pmatrix}(v_{Cq}^{k}-\hat{v}_{Cq}^{k})$$

$$K = \begin{pmatrix} K_1 \\ K_2 \\ K_3 \end{pmatrix} = \begin{pmatrix} 2\cos\omega_{fx}T+ \\ 1+2\cos\omega_{fx}T\dfrac{4\cos^2\omega_{fx}T-1}{2Z_{fx}\sin\omega_{fx}T} \\ \dfrac{2\cos\omega_{fx}T-}{\dfrac{4\cos^2\omega_{fx}T+1}{\dfrac{2L_{fx}}{L_f}(1-\cos\omega_{fx}T)}} \end{pmatrix}^T \quad (109)$$

$$\begin{pmatrix} \hat{i}_{Ld}^{k+1} \\ \hat{i}_{Lq}^{k+1} \end{pmatrix} = \begin{pmatrix} \cos\omega T & -\sin\omega T \\ \sin\omega T & \cos\omega T \end{pmatrix}\begin{pmatrix} i_{Ld}^{k} \\ i_{Lq}^{k} \end{pmatrix} + \dfrac{\sin\omega T}{\omega L_f}\begin{pmatrix} \dfrac{E_d}{2}u_d^{k}-v_{Cd}^{k} \\ \dfrac{E_d}{2}u_q^{k}-v_{Cq}^{k} \end{pmatrix} \quad (110)$$

$$\begin{pmatrix} \hat{i}_{Ld}^{k+1} \\ \hat{i}_{Lq}^{k+1} \end{pmatrix} = \begin{pmatrix} \hat{i}_{Ld}^{k+1} \\ \hat{i}_{Lq}^{k+1} \end{pmatrix} - \begin{pmatrix} \hat{i}_{Cdx}^{k+1} \\ \hat{i}_{Cqx}^{k+1} \end{pmatrix} + \begin{pmatrix} 0 & -\omega C_f \\ \omega C_f & 0 \end{pmatrix}\begin{pmatrix} \hat{v}_{Cd}^{k+1} \\ \hat{v}_{Cq}^{k+1} \end{pmatrix} \quad (111)$$

$$\begin{pmatrix} \hat{v}_{Ld}^{k+1} \\ \hat{v}_{Lq}^{k+1} \end{pmatrix} = \begin{pmatrix} \hat{v}_{Ld}^{k+1} \\ \hat{v}_{Lq}^{k+1} \end{pmatrix} + \begin{pmatrix} 0 & -\omega L_f \\ \omega L_f & 0 \end{pmatrix}\begin{pmatrix} \hat{i}_{Ld}^{k+1} \\ \hat{i}_{Lq}^{k+1} \end{pmatrix}$$

$$\begin{pmatrix} \hat{v}_{Ld}^{k+1} \\ \hat{v}_{Lq}^{k+1} \end{pmatrix} = \dfrac{2L_f-\gamma_L T}{\gamma_L T+2L_f}\begin{pmatrix} \hat{v}_{Ld}^{k} \\ \hat{v}_{Lq}^{k} \end{pmatrix} + \dfrac{2\gamma_L L_f}{\gamma_L T+2L_f}\begin{pmatrix} \hat{i}_{Ld}^{k+1}-i_{Ld}^{k} \\ \hat{i}_{Lq}^{k+1}-i_{Lq}^{k} \end{pmatrix} \quad (112)$$

$$u_d^{k+1} = u_{reg\_d}^{k+1} + \dfrac{2}{E_d}\left(\hat{v}_{Dd}^{k+1}+\hat{v}_{Ld}^{k+1}+2\omega L_f \hat{i}_{Cqx}^{k+1}\right)$$

$$u_q^{k+1} = u_{reg\_q}^{k+1} + \dfrac{2}{E_d}\left(\hat{v}_{Dq}^{k+1}+\hat{v}_{Lq}^{k+1}-2\omega L_f \hat{i}_{Cdx}^{k+1}\right) \quad (113)$$

Figure 11:
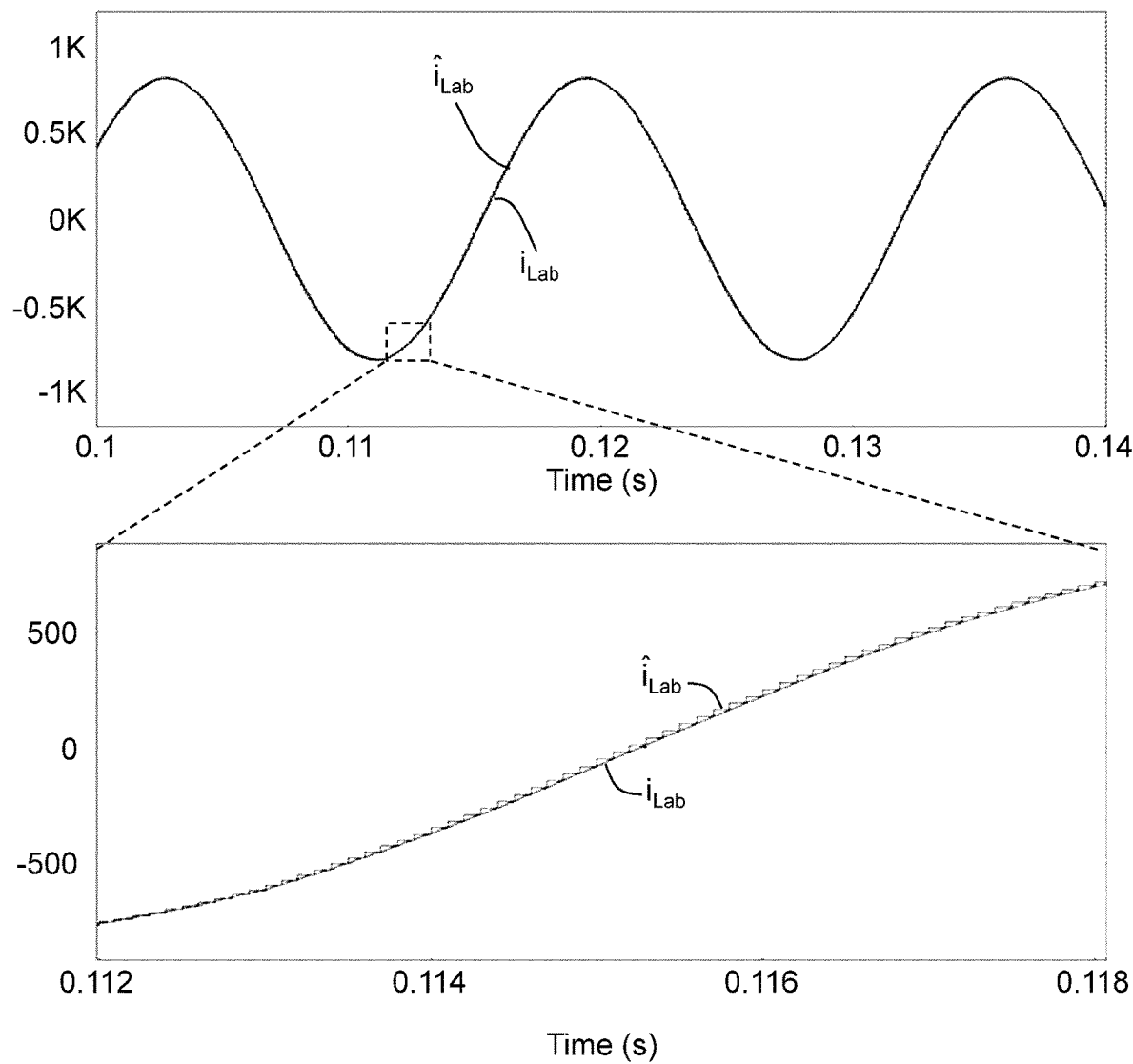
FIG. 11 shows the simulation verification waveform of the load current of the three-phase DC-AC inverter.
Figure 12:
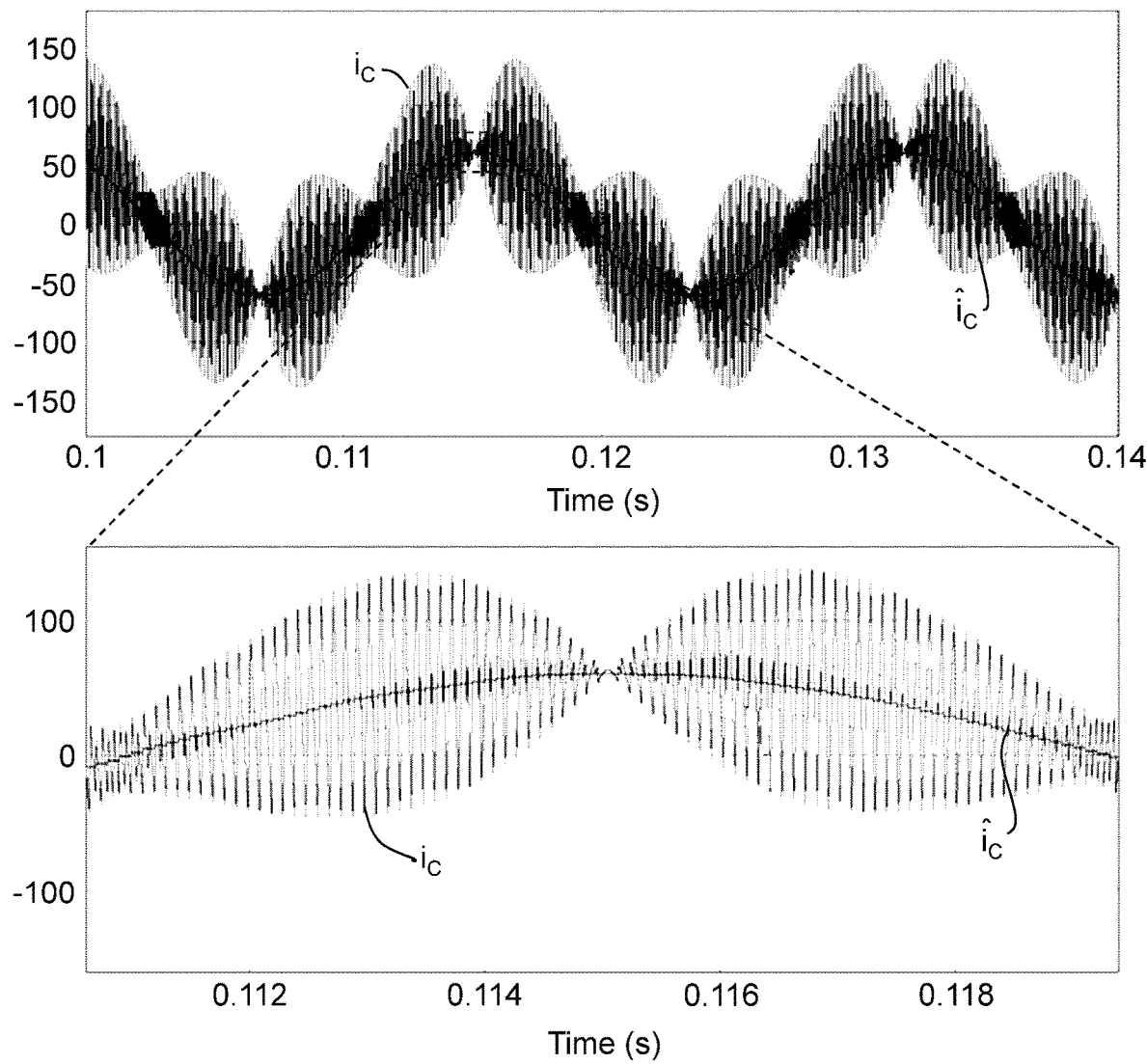
FIG. 12 shows the simulation verification waveform of the capacitor current of the three-phase DC-AC inverter.
Figure 13:
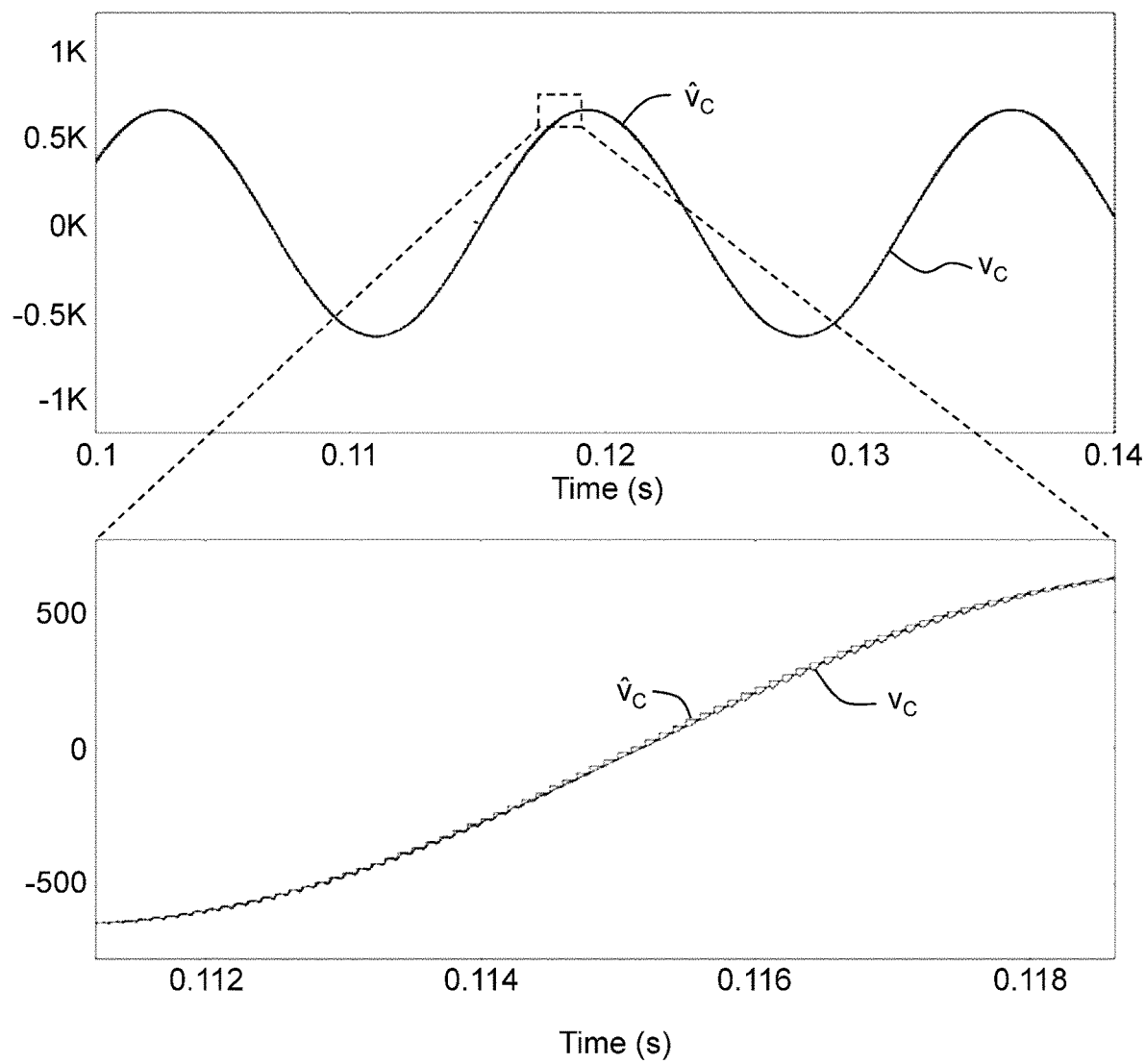
FIG. 13 shows the simulation verification waveform of the capacitor voltage of the three-phase DC-AC inverter.
Figure 14:
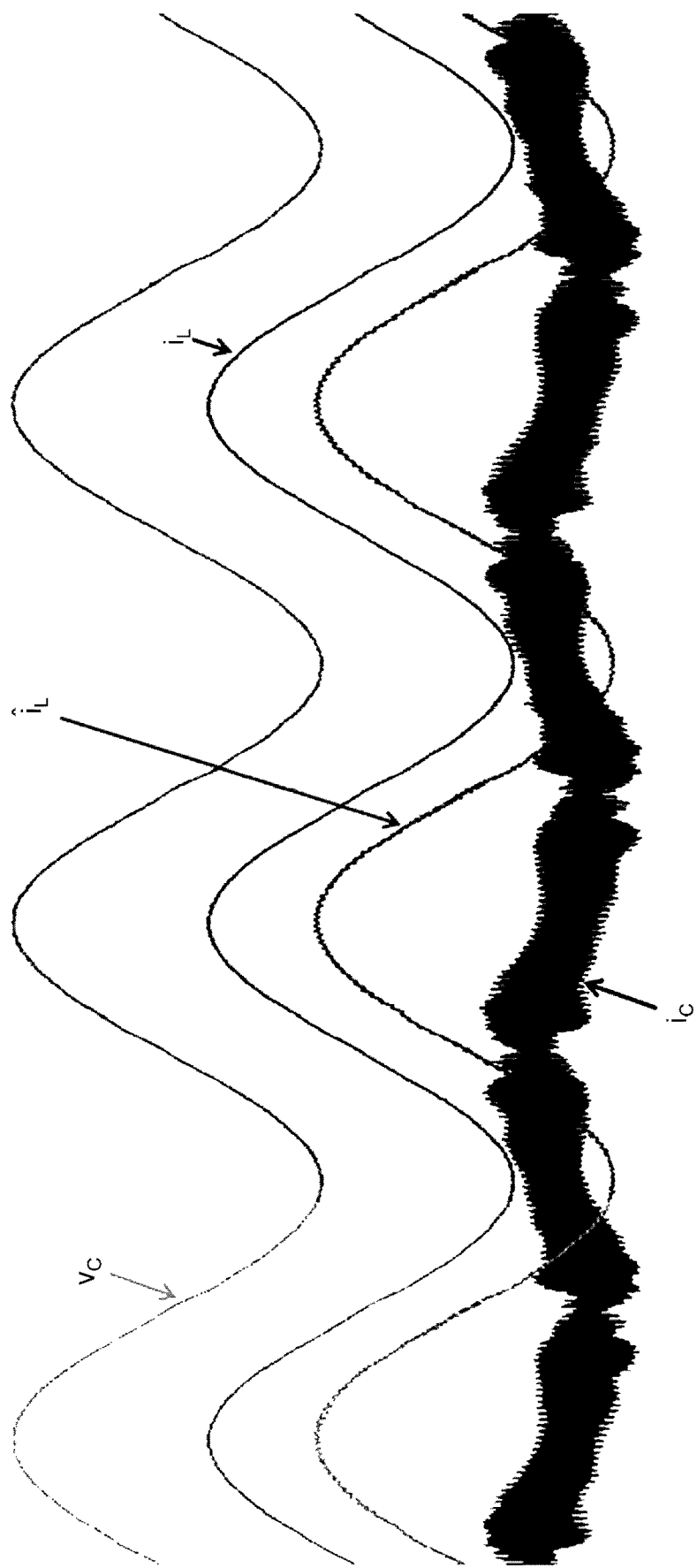
FIG. 14 shows the test verification waveform of the load current of the single-phase DC-AC inverter.
Figure 15:
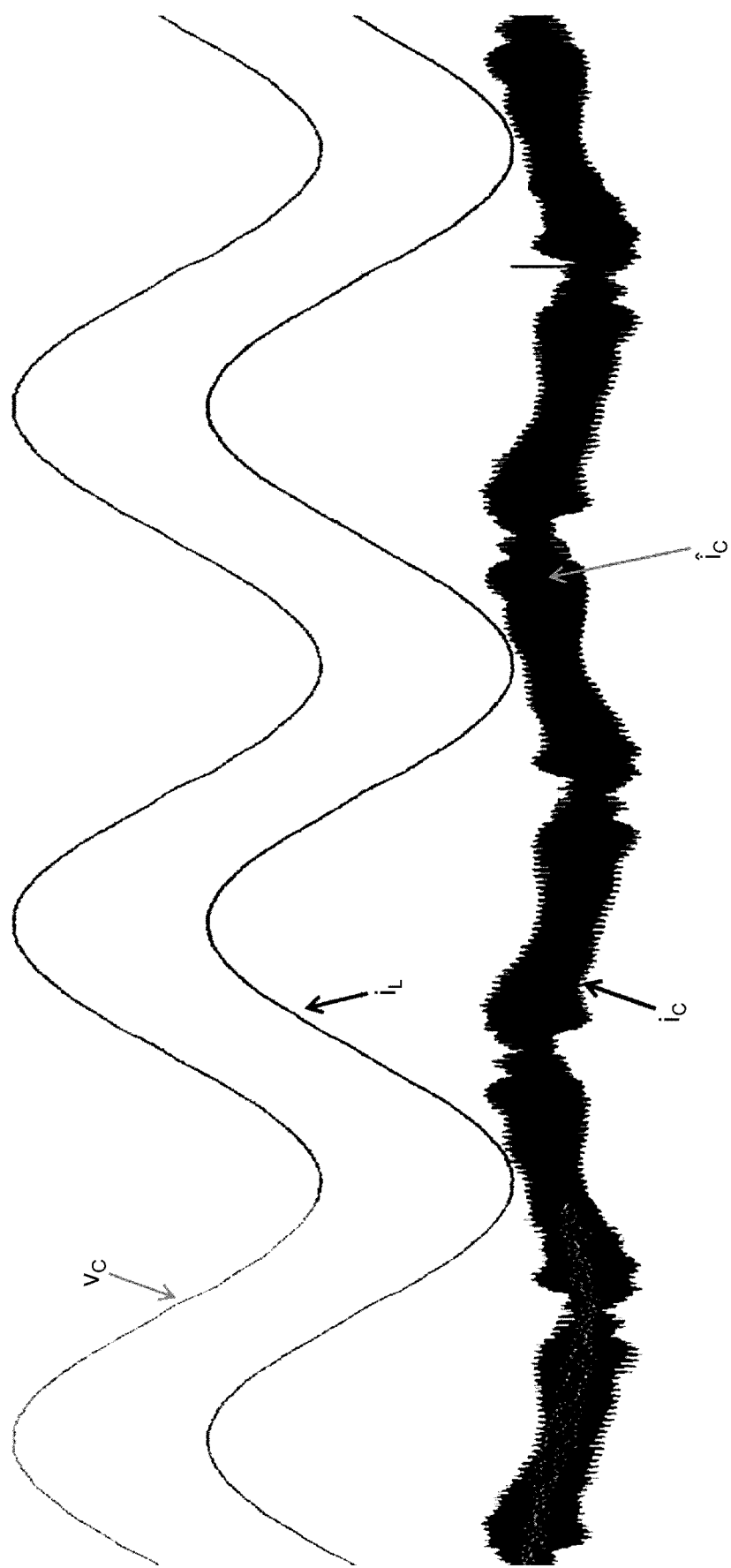
FIG. 15 shows the test verification waveform of the capacitor current of the single-phase DC-AC inverter.
Figure 16:
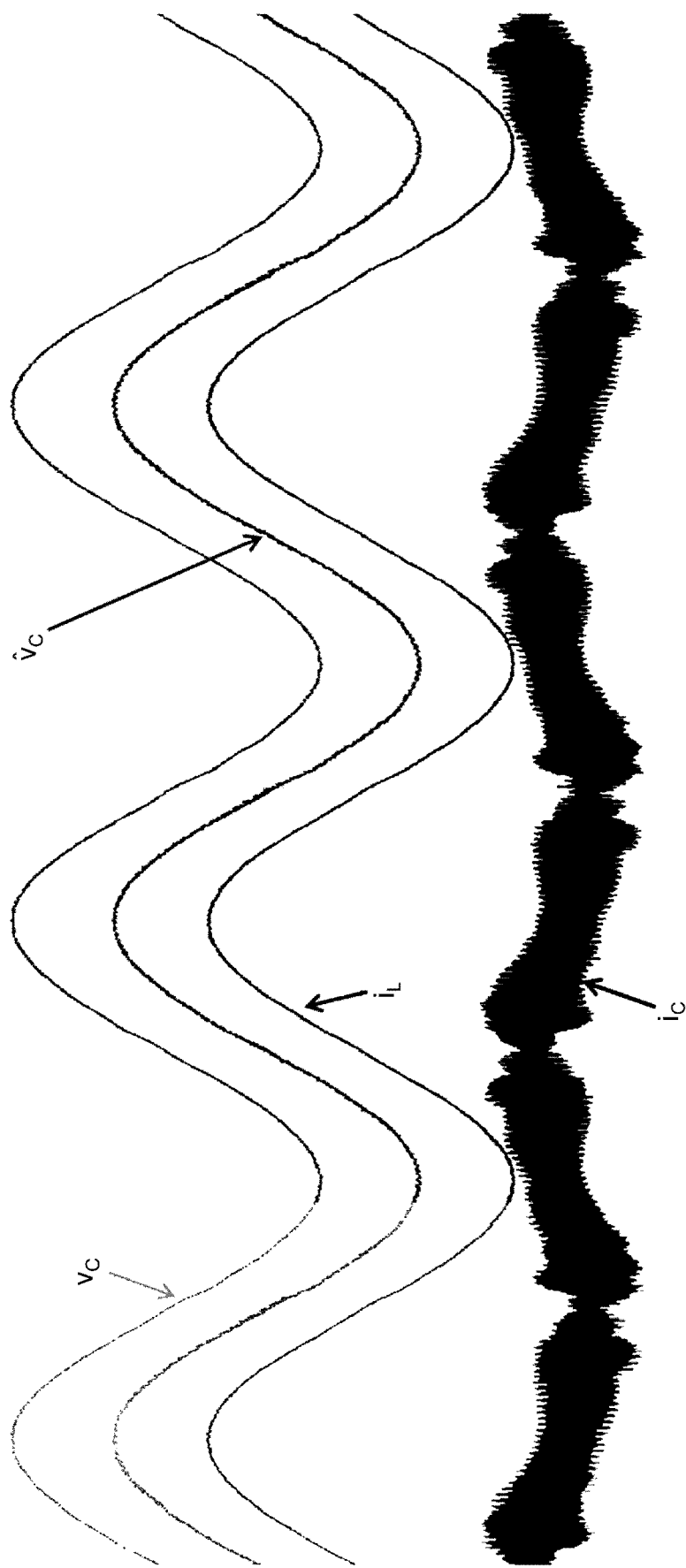
FIG. 16 shows the test verification waveform of the capacitor voltage of the single-phase DC-AC inverter.
Figure 17:
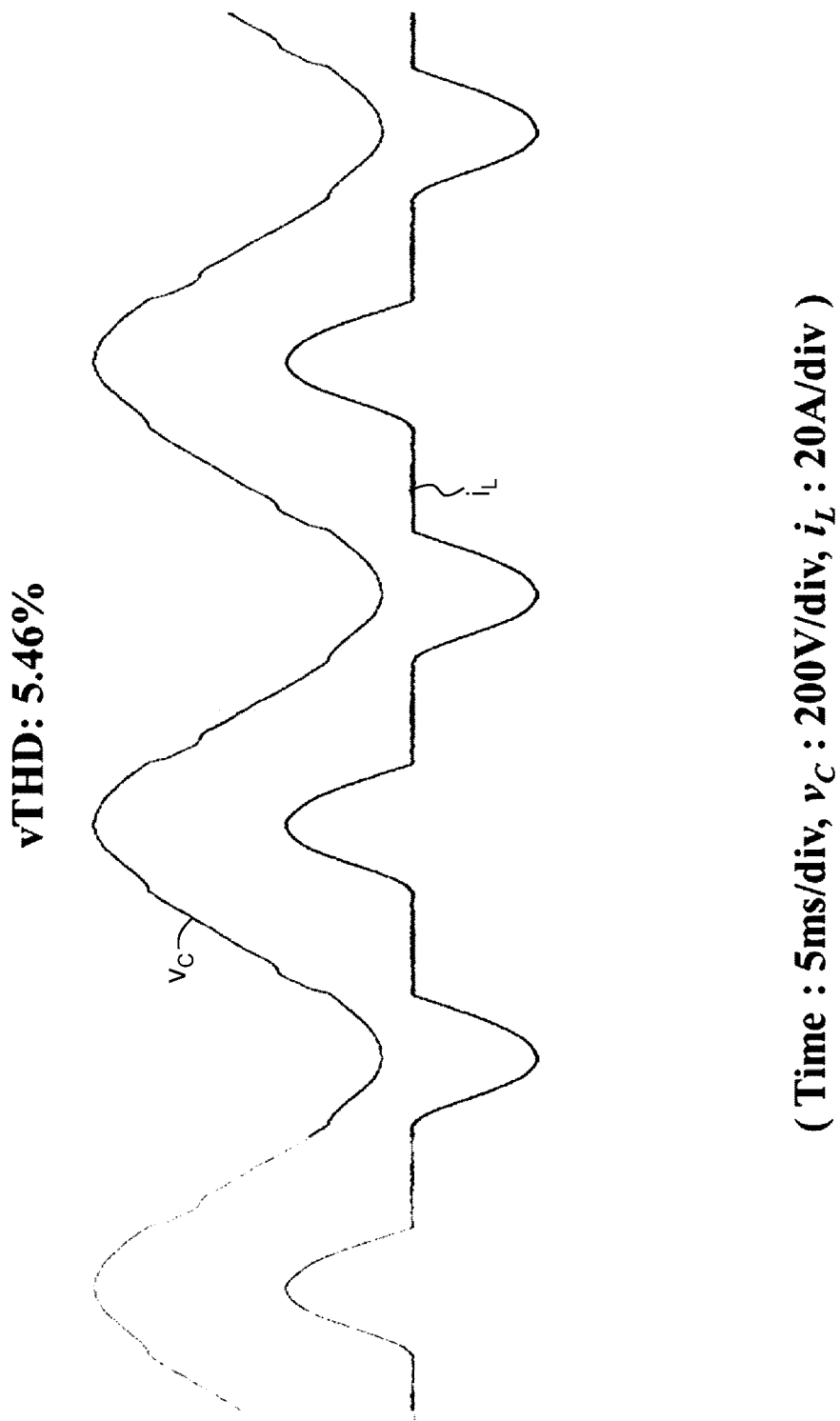
FIG. 17 shows the test verification waveform of the rectifier load in the feed-forward control without using the inductor voltage.
Figure 18:
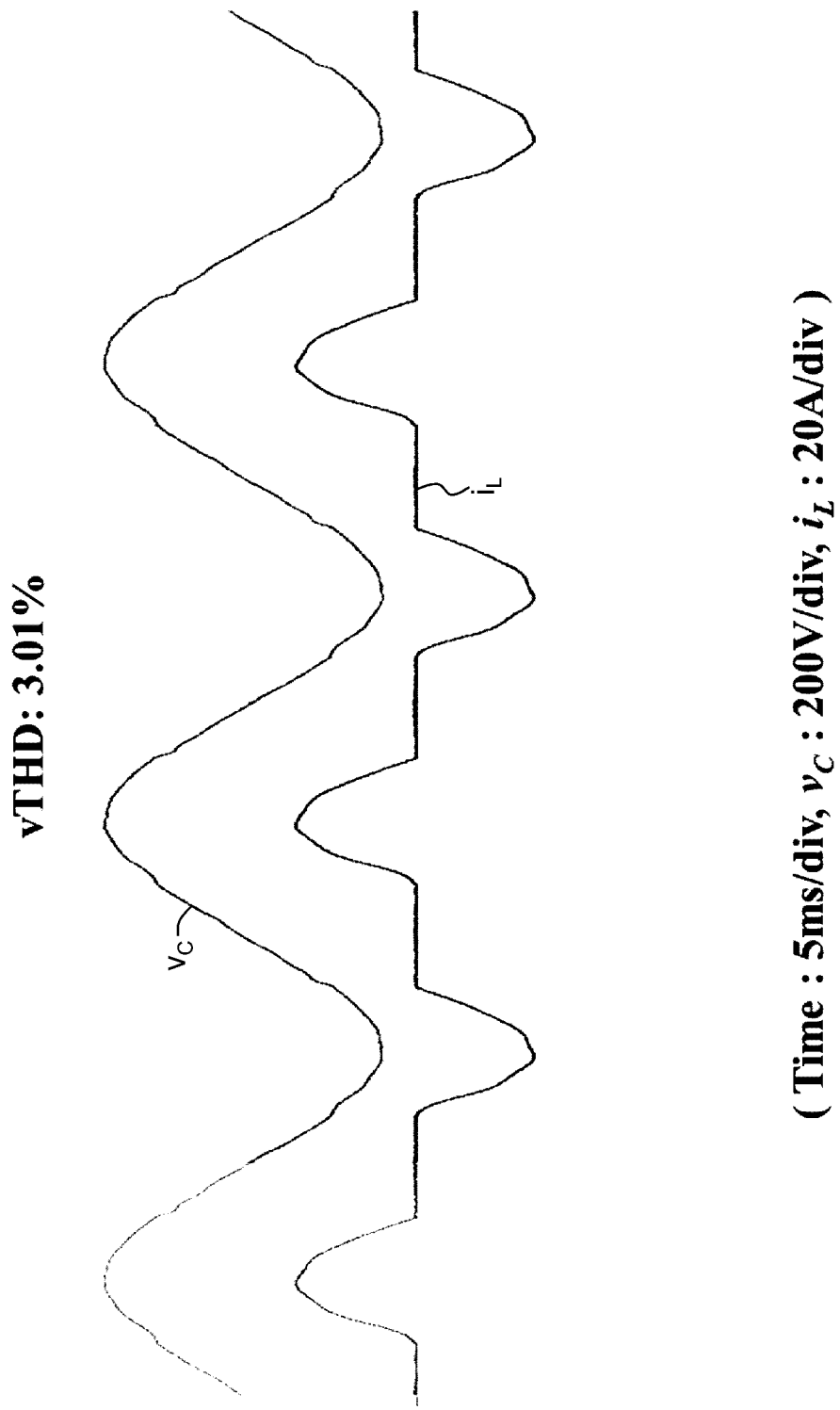
FIG. 18 shows the test verification waveform of the rectifier load in the feed-forward control using the inductor voltage.

Please refer to FIGS. 11 to 13. FIG. 11 shows the simulation verification waveform of the load current of the three-phase DC-AC inverter. FIG. 12 shows the simulation verification waveform of the capacitor current of the three-phase DC-AC inverter. FIG. 13 shows the simulation verification waveform of the capacitor voltage of the three-phase DC-AC inverter. It can be seen from FIG. 11 and FIG. 13 that the calculated load current and the filter capacitor voltage are the estimated values at the next sampling time. It can be seen from FIG. 12 that the calculated filter capacitor current is an average value without ripple. Please refer to FIGS. 14 to 18. FIG. 14 shows the verification waveform of the load current of the single-phase DC-AC inverter. FIG. 15 shows the verification waveform of the capacitor current of the single-phase DC-AC inverter. FIG. 16 shows the verification waveform of the capacitor voltage of the single-phase DC-AC inverter. FIG. 17 shows the verification waveform of the rectifier load in the feed-forward control without using the inductor voltage. FIG. 18 shows the verification waveform of the rectifier load in the feed-forward control using the inductor voltage. FIG. 14 to FIG. 18 show the test verification waveforms of the single-phase DC-AC inverter under full load. As shown in FIG. 14 to FIG. 16, the load current estimation value, the filter capacitor current and the filter capacitor voltage are correct. The filter-capacitor-current estimation value is the average value without ripple. FIGS. 17 and 18 show the results of the feed-forward control with the inductor voltage under the standalone mode with the rectifier load. The total harmonic distortion (THD) of the filter capacitor voltage is 3.01%, which is significantly better than the feed-forward control result without the inductor voltage (5.46%).

Based on the foregoing descriptions, the control method in this disclosure is applicable to the single-phase and the three-phase DC-AC inverter systems, and the three-phase systems can be used for the phase element control, the line element control, and the D-Q axis element control. The present disclosure provides a sensorless control method for the filter capacitor current and the load current using the state observer, and applies it to a DC-AC inverter system. The DC link voltage, the inductor current and the filter capacitor voltage are detected by a hardware circuit, then the filter capacitor voltage, the filter capacitor current, the disturbance voltage, the load current and the inductor voltage can be estimated. The filter-capacitor-current estimation value can be obtained without any hardware sensor, and the average value of the filter-capacitor-current estimation value is not affected by the ripples. On the other hand, the system control flow can refer to the system control block diagram in FIG. 7A. On the other hand, the estimated value at the next sampling time is used as the feedback value of the entire system control process, so the control time delay problem of the digital controller and the system performance can be improved. The control method proposed in this disclosure is applicable regardless of the on-grid mode, the standalone mode or the transfer mode. All parameters of the state observer are controllable factors, having high accuracy and predictability. The system is controlled by the filter capacitor current, and the system responds well. The system is controlled digitally, and the calculation results of the state observer can reduce the sampling time error. In addition, the load current can be predicted without a hardware sensor, which can reduce the cost of materials, labor procurement and maintenance, and avoid the change of component characteristics due to temperature changes, component and circuit failures. Therefore, it can improve the reliability of the system.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A control method of a DC-AC inverter system, comprising:
receiving, by a state observer, a DC link voltage at a current sampling time and a filter-capacitor-voltage actual value at the current sampling time;
outputting, by the state observer, a filter-capacitor-current estimation value at a next sampling time according to the DC link voltage at the current sampling time and the filter-capacitor-voltage actual value at the current sampling time, wherein the filter-capacitor-current estimation value at the next sampling time is an average current value without ripple;

receiving, by an inductor current calculator, a filter-inductor-current actual value at the current sampling time;

outputting, by the inductor current calculator, a filter-inductor-current estimation value at the next sampling time according to the DC link voltage at the current sampling time and the filter-inductor-current actual value at the current sampling time;

comparing the filter-inductor-current estimation value at the next sampling time with the filter-capacitor-current estimation value at the next sampling time to obtain a load current estimation value at the next sampling time;

outputting, by an inductor voltage estimator, a filter-inductor-voltage estimation value at the next sampling time according to the load current estimation value at the next sampling time; and performing a feed-forward control according to the filter-inductor-voltage estimation value at the next sampling time.

2. The control method of the DC-AC inverter system according to claim 1, further comprising:

obtaining a filter-capacitor-current estimation value at the current sampling time according to the filter-capacitor-current estimation value at the next sampling time;

comparing the filter-capacitor-current estimation value at the current sampling time with the filter-inductor-current actual value at the current sampling time to obtain a load current estimation value at the current sampling time;

obtaining, by an inductor voltage calculator, a filter-inductor-voltage estimation value at the current sampling time according to the load current estimation value at the current sampling time;

wherein the state observer outputs the filter-capacitor-current estimation value at the next sampling time according to the filter-inductor-voltage estimation value at the current sampling time.

3. The control method of the DC-AC inverter system according to claim 2, wherein the state observer further outputs a filter-capacitor-voltage estimation value at the next sampling time.

4. The control method of the DC-AC inverter system according to claim 2, wherein the state observer further outputs a disturbance-voltage estimation value at the next sampling time.

5. The control method of the DC-AC inverter system according to claim 4, wherein the DC-AC inverter system performs the feed-forward control according to the DC link voltage at the current sampling time, the disturbance-voltage estimation value at the next sampling time, and the filter-inductor-voltage estimation value at the next sampling time.

6. The control method of the DC-AC inverter system according to claim 4, wherein the inductor current calculator outputs the filter-inductor-current estimation value at the next sampling time according to the disturbance-voltage estimation value at the next sampling time.

7. The control method of the DC-AC inverter system according to claim 2, wherein the inductor voltage estimator outputs the filter-inductor-voltage estimation value at the next sampling time according to the load current estimation value at the current sampling time and the filter-inductor-voltage estimation value at the current sampling time.

8. The control method of the DC-AC inverter system according to claim 2, wherein the DC-AC inverter system is a single-phase DC-AC inverter system or a three-phase DC-AC inverter system.

9. The control method of the DC-AC inverter system according to claim 2, wherein the DC-AC inverter system is used in an on-grid mode, a standalone mode or a transfer mode.

10. A DC-AC inverter system, comprising:

a state observer, configured to receive a DC link voltage at a current sampling time and a filter-capacitor-voltage actual value at the current sampling time, and output a filter-capacitor-current estimation value at a next sampling time according to the DC link voltage at the current sampling time and the filter-capacitor-voltage actual value at the current sampling time, wherein the filter-capacitor-current estimation value at the next sampling time is an average current value without ripple;

an inductor current calculator, configured to receive a filter-inductor-current actual value at the current sampling time, and output a filter-inductor-current estimation value at the next sampling time according to the DC link voltage at the current sampling time and the filter-inductor-current actual value at the current sampling time;

a first comparator, configured to compare the filter-inductor-current estimation value at the next sampling time with the filter-capacitor-current estimation value at the next sampling time to obtain a load current estimation value at the next sampling time; and an inductor voltage estimator, configured to output a filter-inductor-voltage estimation value at the next sampling time according to the load current estimation value at the next sampling time;

wherein the filter-inductor-voltage estimation value at the next sampling time is used for performing a feed-forward control.

11. The DC-AC inverter system according to claim 10, further comprising:

a delay calculator, configured to obtain a filter-capacitor-current estimation value at the current sampling time according to the filter-capacitor-current estimation value at the next sampling time;

a second comparator, configured to compare the filter-capacitor-current estimation value at the current sampling time with the filter-inductor-current actual value at the current sampling time to obtain a load current estimation value at the current sampling time;

an inductor voltage calculator, configured to obtain a filter-inductor-voltage estimation value at the current sampling time according to the load current estimation value at the current sampling time;

wherein the state observer outputs the filter-capacitor-current estimation value at the next sampling time according to the filter-inductor-voltage estimation value at the current sampling time.

12. The DC-AC inverter system according to claim 11, wherein the state observer also outputs a filter-capacitor-voltage estimation value at the next sampling time.

13. The DC-AC inverter system according to claim 11, wherein the state observer also outputs a disturbance-voltage estimation value at the next sampling time.

14. The DC-AC inverter system according to claim 13, wherein the DC-AC inverter system performs the feed-forward control according to the DC link voltage at the current sampling time, the disturbance-voltage estimation value at the next sampling time, and the filter-inductor-voltage estimation value at the next sampling time.

15. The DC-AC inverter system according to claim 13, wherein the inductor current calculator outputs the filter-inductor-current estimation value at the next sampling time according to the disturbance-voltage estimation value at the next sampling time.

16. The DC-AC inverter system according to claim 11, wherein the inductor voltage estimator outputs the filter-inductor-voltage estimation value at the next sampling time according to the load current estimation value at the current sampling time and the filter-inductor-voltage estimation value at the current sampling time.

17. The DC-AC inverter system according to claim 11, wherein the DC-AC inverter system is a single-phase DC-AC inverter system or a three-phase DC-AC inverter system.

18. The DC-AC inverter system according to claim 11, wherein the DC-AC inverter system is used in an on-grid mode, a standalone mode or a transfer mode.

* * * * *